United States Patent
Khosravy

(10) Patent No.: US 11,301,523 B2
(45) Date of Patent: Apr. 12, 2022

(54) SEMANTIC ANALYSIS OF INFORMATION

(71) Applicant: MICROSOFT TECHNOLOGY LICENSING, LLC, Redmond, WA (US)

(72) Inventor: Moe Khosravy, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/743,460

(22) Filed: Jun. 18, 2015

(65) Prior Publication Data
US 2015/0286730 A1  Oct. 8, 2015

Related U.S. Application Data

(63) Continuation of application No. 12/908,737, filed on Oct. 20, 2010, now Pat. No. 9,076,152.

(51) Int. Cl.
| | |
|---|---|
| G06F 16/9535 | (2019.01) |
| G06F 16/36 | (2019.01) |
| G06F 16/958 | (2019.01) |
| G06F 16/23 | (2019.01) |
| G06F 16/901 | (2019.01) |
| G06Q 30/02 | (2012.01) |

(Continued)

(52) U.S. Cl.
CPC ...... *G06F 16/9535* (2019.01); *G06F 16/2358* (2019.01); *G06F 16/36* (2019.01); *G06F 16/9024* (2019.01); *G06F 16/958* (2019.01); *G06N 5/04* (2013.01); *G06Q 10/063* (2013.01); *G06Q 30/02* (2013.01); *G06Q 30/0201* (2013.01)

(58) Field of Classification Search
CPC ................................................ G06F 17/30315
USPC .......................................................... 706/55
See application file for complete search history.

(56) References Cited

U.S. PATENT DOCUMENTS

| | | | |
|---|---|---|---|
| 5,577,165 A | 11/1996 | Takebayashi et al. | |
| 5,717,915 A | 2/1998 | Stolfo et al. | |

(Continued)

FOREIGN PATENT DOCUMENTS

| | | |
|---|---|---|
| CN | 101044472 A | 9/2007 |
| CN | 101763378 A | 6/2010 |
| WO | 2006026702 A2 | 3/2006 |

OTHER PUBLICATIONS

'EcoLens: Integration and interactive visualization of ecological datasets': Parr, 2007, Elsevier, Ecological Informatics 2007, pp. 61-69.*

(Continued)

*Primary Examiner* — Li B. Zhen
*Assistant Examiner* — Peter D Coughlan
(74) *Attorney, Agent, or Firm* — Fiala & Weaver P.L.L.C.

(57) ABSTRACT

Semantic information that describes data sets is inferred based upon a semantic analysis performed on data sets retained within a data repository. The semantic analysis can include a determination of formats associated with fields of the data sets and a comparison of values of the fields against reference data sets having predetermined semantic types. Correlations are inferred between data sets based upon respective semantic information. The correlations are incorporated into visualizations displayed in connection with a graphical user interface.

20 Claims, 17 Drawing Sheets

(51) Int. Cl.
  *G06Q 10/06* (2012.01)
  *G06N 5/04* (2006.01)

(56) References Cited

U.S. PATENT DOCUMENTS

| | | | |
|---|---|---|---|
| 5,966,531 | A | 10/1999 | Skeen et al. |
| 6,263,331 | B1* | 7/2001 | Liu .................. G06F 16/24552 |
| 7,035,846 | B2 | 4/2006 | Gupta et al. |
| 7,562,814 | B1 | 7/2009 | Shao et al. |
| 7,624,078 | B2 | 11/2009 | Dietrich, Jr. et al. |
| 7,644,361 | B2 | 1/2010 | Wu et al. |
| 7,788,602 | B2 | 8/2010 | Reynar et al. |
| 2002/0158765 | A1* | 10/2002 | Pape ..................... A01K 29/005 340/573.3 |
| 2004/0064441 | A1* | 4/2004 | Tow .................. G06F 16/24542 |
| 2004/0220790 | A1* | 11/2004 | Cullick .................. G06Q 10/06 703/10 |
| 2004/0225899 | A1 | 11/2004 | Mizrah |
| 2005/0171760 | A1 | 8/2005 | Tinkler |
| 2005/0234880 | A1 | 10/2005 | Zeng et al. |
| 2006/0036592 | A1* | 2/2006 | Das ................... G06F 17/30418 |
| 2006/0112146 | A1 | 5/2006 | Song et al. |
| 2007/0174196 | A1 | 7/2007 | Becker et al. |
| 2007/0239697 | A1* | 10/2007 | Chen ................ G06F 17/30616 |
| 2008/0005677 | A1 | 1/2008 | Thompson |
| 2008/0082480 | A1 | 4/2008 | Gounares et al. |
| 2008/0082494 | A1 | 4/2008 | Polo-Malouvier et al. |
| 2008/0282189 | A1* | 11/2008 | Hofmann .............. G06F 40/194 715/793 |
| 2009/0013405 | A1 | 1/2009 | Schipka |
| 2009/0119268 | A1 | 5/2009 | Bandaru et al. |
| 2009/0119572 | A1 | 5/2009 | Koivunen |
| 2009/0177463 | A1 | 7/2009 | Gallagher et al. |
| 2009/0216809 | A1* | 8/2009 | Horii ................. G06F 16/24534 |
| 2009/0240638 | A1 | 9/2009 | Kirpal et al. |
| 2009/0276426 | A1 | 11/2009 | Liachenko et al. |
| 2009/0322756 | A1 | 12/2009 | Robertson et al. |
| 2010/0005049 | A1 | 1/2010 | Kawai et al. |
| 2010/0023496 | A1 | 1/2010 | Mohan |
| 2010/0049590 | A1 | 2/2010 | Anshul |
| 2010/0094910 | A1 | 4/2010 | Bayliss |
| 2010/0150397 | A1 | 6/2010 | Handley et al. |
| 2010/0241639 | A1* | 9/2010 | Kifer ................. G06F 17/30616 707/754 |

OTHER PUBLICATIONS

"Extended Search Report Issued in European Patent Application No. 11834813.5", dated Mar. 31, 2016, 6 Pages.
"Final Office Action Received for U.S. Appl. No. 12/908,737", dated Oct. 10, 2013, 44 Pages.
"Non Final Office Action Received for U.S. Appl. No. 12/908,737", dated Mar. 27, 2014, 29 Pages.
"Non Final Office Action Received for U.S. Appl. No. 12/908,737", dated Jun. 13, 2013, 28 Pages.
"Notice of Allowance Issued in U.S. Appl. No. 12/908,737", dated Aug. 29, 2014, 9 Pages.
"Notice of Allowance Issued in U.S. Appl. No. 12/908,737", dated Mar. 10, 2015, 8 Pages.
"First Office Action and Search Report Issued in Chinese Patent Application No. 201110340480.2", dated Dec. 3, 2013, 15 Pages.
"Notice of Allowance Issued in Chinese Patent Application No. 201110340480.2", dated Apr. 3, 2015, 4 Pages.
"Second Office Action and Search Report Issued in Chinese Patent Application No. 201110340480.2", dated Jun. 30, 2014, 13 Pages.
"Third Office Action Received for Chinese Patent Application No. 201110340480.2", dated Jan. 5, 2015, 7 Pages.
"Notice Of Allowance Issued In Australia Patent Application No. 2011318496", dated Sep. 25, 2014, 2 Pages.
"Office Action Issued In Australia Patent Application No. 2011318496", dated Aug. 16, 2014, 3 Pages.
"International Search Report & Written Opinion Received for PCT Application No. PCT/US2011/053038", dated Apr. 27, 2012, 9 Pages.
Fan, Jung-Wei, "Word Sense Disambiguation via Semantic Type Classification", In Proceedings of Annual Symposium of American Medical Informatics Association, 2008, 9 Pages.
Moe, Khasravy, "Microsoft Codename "Dallas" Information as Service", Published on: Jul. 19, 2010, 23 Pages.
Pustejovsky, James, "Rerendering Semantic Ontologies: Automatic Extensions to UMLS Through Corpus", Jul. 10, 2010, 8 Pages.
"Office Action Issued in European Patent Application No. 11834813. 5", dated Dec. 8, 2016, 7 Pages.
"Non-Final Office Action Issued in U.S. Appl. No. 14/743,495", dated Sep. 9, 2016, 26 Pages.
Parr, et al., "Ecolens: Integration and Interactive Visualization of Ecological Datasets", In Journal of Ecological Informatics, vol. 2, Issue 1, Jan. 1, 2007, pp. 61-69.
Veeraraghavan, et al. "Fidelity-Aware Replication for Mobile Devices", In Proceedings of the 7th International Conference on Mobile Systems, Applications, and Services, Jun. 22, 2009, pp. 83-94.
"Final Office Action Issued in U.S. Appl. No. 14/743,495", dated May 3, 2017, 50 Pages.
"Non-Final Office Action Issued in U.S. Appl. No. 14/743,495", dated Nov. 16, 2017, 54 Pages.
"Oral Hearing Issued in European Patent Application No. 11834813. 5", dated May 10, 2019, 09 Pages.

\* cited by examiner

SEMANTIC ANALYSIS OF INFORMATION

CROSS-REFERENCE TO RELATED APPLICATIONS

This application is a continuation of U.S. patent application Ser. No. 12/908,737, filed Oct. 20, 2010, the entirety of which is incorporated by reference herein.

TECHNICAL FIELD

The subject disclosure relates to analyzing data sets to infer semantic information and generating visualizations based thereon.

BACKGROUND

By way of background concerning some conventional systems, computing devices have traditionally stored information and associated applications and data services locally to the device. Yet, with the evolution of on-line and cloud services, information is increasingly being moved to network providers who perform none, some or all of service on behalf of devices. The evolution of network storage farms capable of storing terabytes of data (with potential for petabytes, exabytes, etc. of data in the future) has created an opportunity to mimic the local scenario in a cloud, with separation of the primary device and the external storage.

However, no cloud service or network storage provider has been able to effectively provide information as a service on any platform, with publishers, developers, and consumers easily publishing, specializing applications for and consuming any kind of data, in a way that can be tracked and audited for all involved. In addition, due to the disparate number of content providers and their typically proprietary schemas for defining data, today, where disparate content providers do not coordinate their publishing acts to the cloud with one another, there is little opportunity to leverage the collective power of such disparate publishing acts. In effect, to the consuming audience of the publishing, such as subscribers or developers, two different data sets look like they have two different shapes, even where there may be some or substantial overlap of data or data types.

More specifically, currently, the way data is uploaded by different parties is such that a similar column of different data sets (e.g., both representing city), if even named at all, will have different names, which may or may not be similar. In either case, human intervention into the underlying data and verification is the conventional way to determine what columns should be named the same or similarly, or to otherwise determine what the relationship between the types or columns of data might be. In addition to being unscalable, such intervention in the underlying data may not be desirable to publishers who want to guarantee their data remains unaltered, as may be the case for a host of proprietary data sets that might be published to the cloud.

The above-described deficiencies of today's devices and data services are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

A variety of data sets can be stored in a larger repository, in a unified manner, to provide an information-as-a-service system. The variety of data sets can be respectively published by disparate publishers and, accordingly, the data sets can include overlapping fields or columns. The system can perform semantic analysis on the data sets to infer a semantic type or meaning of various fields or columns of the data sets. The information-as-a-service system can learn and self-describe data stored in the data sets in an evolving way as more and more semantics are discovered.

Additionally, with learned semantic information, the information-as-a-service system can discover relationships between data sets via the overlapping fields or columns. For instance, the information-as-a-service system can generate mash-ups, e.g., joins or links between data sets, which can expose previously unknown correlations among data in the data sets. The mash-ups can form the basis of rich visualizations of data relationships and/or user interfaces provided to users of the system.

Semantic information can be inferred via a series of complementary and/or supplementary actions. The actions can verify, override, or enhance tags applied to fields or columns of data sets via manual means, e.g., human input entered by hand. Field names can be checked against a list of potentially valid names with known semantic types. Matches can be employed to associate a semantic type with the field or column. Near matches can be presented to a user for verification. In another analysis, a format of fields of the data set can be identified to facilitate determination of a semantic type. Based upon the format or other parameters, one or more reference data sets, e.g., with known semantic types, can be selected to check values of the fields or columns.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
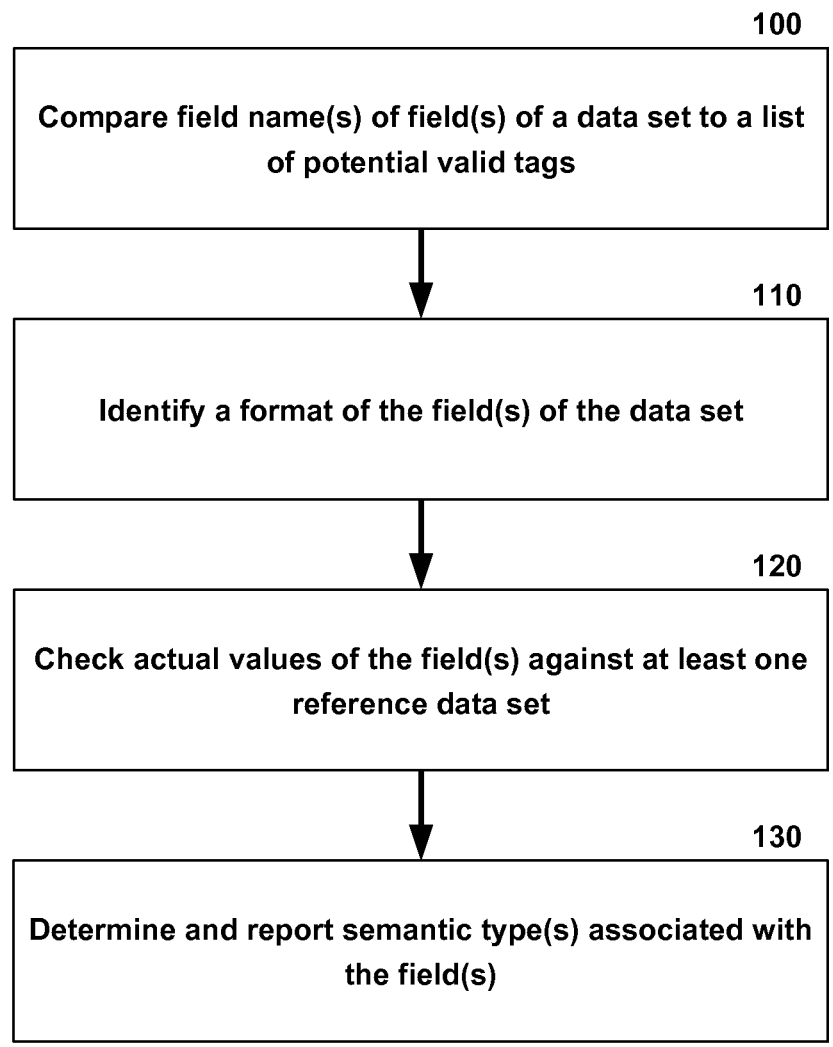
FIG. 1 is a flow diagram illustrating an exemplary non-limiting embodiment for determining semantic information associated with a data set.

As discussed in the background, different content providers providing different data sets do not generally coordinate with respect to possible overlap of information or data types represented in their data sets since they generally have no knowledge of one another's data sets, or any particular incentive to do so. In an information-as-a-service system (also referred to herein as information provided as a service from any platform) where one of the guarantees by the storage entity is adherence to access restrictions requested by the publisher, currently, there is no way to learn or visualize unique correlations between different data sets on the develop or consumption side except through inside knowledge of specific contents of the data sets. In addition, in information-as-a-service systems, another guarantee provided by the storage entity is non-interference with the underlying data sets after publishing, so that the data published remains unaltered. In such cases, the unique correlations, if known, cannot currently be leveraged without development of custom applications.

For instance, content provider A may publish a table including columns for latitude, longitude, with corresponding crime rate, e.g., column names of lat, long and cri_rate.

Content provider B may publish movie theatre information for cities, with x and y coordinates corresponding to latitude and longitude, except the column for city may instead be called "Name", e.g., column names of _theatre, _Name, _x and _y. Accordingly, it is unknown by any conventional means on the consumption side that by joining the two sets, one could actually determine the movie theatres in cities having the lowest crime rate, since the semantic meaning of the disparate columns remains abstruse. Moreover, it is likewise unknown by conventional means on the storage side that the two sets can be joined without manual inspection and analysis by a human.

It is thus desirable to determine that _x and _y are lat and long, that _Name means city name and that _theatre refers to movie theatre names. That is, it is desirable to acquire semantic information regarding the columns, wherein the semantic information conveys at least a semantic type indicating the semantic meaning of the data contained in the column. With the semantic information, relationship information can be systematically derived that enables the two data sets to be joined to readily obtain useful data about crime rates near movie theatres—information that could not have been discerned without the semantic information. As mentioned previously, this work can conventionally be done by hand. However, where data sets include numerous entries, columns, or rows, e.g., thousands, millions, billions, etc., manual tagging becomes a burdensome and time consuming task. In addition, the opportunities for mislabeling also increase as the size of data grows.

Accordingly, in various non-limiting embodiments, semantic analysis can be performed on data sets retained in a repository such as, but not limited to, an information-as-a-service system. Through semantic analysis, inferences can be made about the data to augment data sets with semantic information to improve not only the potential for joins, e.g., mash-ups, by providing mapping(s) between columns formerly thought to represent different data/types, but also descriptions of the data and/or fields within the data. In this regard, in accordance with various embodiments, a repository of data sets, e.g., an information-as-a-service system, can systematically learn types of data and connections between data to increase value of the underlying data as well as discover previously unknown correlations.

In one embodiment, a method is described herein that includes extracting a subset of data from a data set stored in a data repository, identifying a format corresponding to the subset of data, selecting at least one reference data set based upon the format, wherein the at least one reference data set is associated with a known semantic type, comparing values of the subset of data against the at least one reference data, and inferring semantic information of the data set based upon comparison results, wherein the semantic information specifies at least a semantic type of data in the data set. In an example, the method can also include providing the semantic information to a user for confirmation. In more examples, extracting the subset of data can include extracting an entirety of the data set, selecting, at random, values of the data set, or extracting a pre-determined number of values from at least one of a beginning of the data set, an end of the data set, or a middle of the data set.

In another example, the method can include validating the values of the subset of data against one or more domain rules, wherein the one or more data rules correspond to the semantic type of data in the data set and presenting invalid values to a user, wherein invalid values include values disallowed by the one or more domain rules. In a further example, the method can include extracting a field name from the data set and comparing the field name to a set of potential valid tags. Further to this example, the method can include identifying when the field name matches a tag in the set of potential valid tags, identifying a type associated with the tag when matched and associating the data set with the type as the semantic type of the data set.

In further examples, the method can include evaluating structures of the values of the subset of data against a plurality of pre-configured patterns, identifying when the structures of the values match a pre-configured pattern, selecting the at least one reference data set, wherein the known semantic type associated with the at least one reference data set corresponds to the pre-configured pattern, and adopting the known semantic type as the semantic type of data of the data set when a number of structures matching the pre-configured pattern exceeds a predetermined threshold.

According to an additional example, comparing the values of the subset of data can include selecting a value from the values, querying the at least one reference data set with the value, and counting a valid hit when a result of the query with the value is returned. The method, in another example, can include identifying a second data set including at least one field corresponding to the semantic type of data of the data set, and generating relationship information that associates the data set with the second data set, wherein the relationship information specifies a correlation between the data set and the second data set. In addition, the method can include obtaining relationship information correlating a plurality of data sets in the data repository, displaying a visualization of the relationship information as part of a graphical user interface, receiving input via the graphical user interface and updating the relationship information based upon the input.

In another embodiment, a semantic analysis system, as described herein, includes a semantic analysis component configured to infer semantic information regarding data of a data set stored by an information-as-a-service system. The semantic analysis component includes a format check component configured to identify a format of sample data extracted from the data set and to select one or more reference data sets based upon the format and a value check component configured to check values of the sample data against the one or more reference data sets to identify a semantic type of the sample data. Additionally, the semantic analysis component infers the semantic information based upon the semantic type identified.

The system, in an example, further includes a domain check component configured to determine whether values of the sample data satisfy a set of domain rules. The set of domain rules establish valid data values for a particular data type. In further examples, the system includes a linking component configured to correlate a plurality of disparate data sets stored by the information-as-a-service system based upon respective semantic information and a visualization component configured to generate a visualization of correlations between data sets stored by the information-as-a-service system. The visualization can comprise a graph display where nodes represent respective data sets and edges represent correlations between data sets.

In an additional embodiment, a computer-readable storage medium is described herein that includes computer-executed instruction that, when executed, cause a computing device to perform extracting a subset of data from a data set stored in a data repository; identifying a format corresponding to the subset of data; selecting at least one reference data set based upon the format, wherein the at least one reference data set is associated with a known semantic type; comparing values of the subset of data against the at least one reference data; and inferring semantic information of the data set based upon comparison results, wherein the semantic information specifies at least a semantic type of data in the data set.

Further details of these and other various exemplary, non-limiting embodiments and scenarios are provided below.

Determining and Visualizing Data Set Semantics in Connection with Information as a Service As mentioned, in the context of information-as-a-service, there is a limit to what machines, without intelligence, can determined from data sets. For instance, such a machine can determine that a first column of a data set includes strings, a second column includes numbers, and a pair of other columns includes mixed data types, e.g., numbers and strings. In addition, while a human can be brought in to classify the data, for large amounts of data, such conventional human classification does not scale well, and if data is re-published by a publisher with different semantics, the human characterization may already be out of date. In addition, a human can incorrectly characterize a set of data as the data can appear as related to a particular domain but the human can lack sufficient domain knowledge to validate the set of data.

Accordingly, in various embodiments, a variety of mechanisms can be applied to data sets in a unified repository to systematically generate semantic information that characterizes types of information and/or meanings of data included in a data set. The semantic information can be employed to validate, replace, and supplement human characterizations. One mechanism involves inferring a data type or column name based on clues in the data or column name, or other column names, of a data set. For instance, column or field names can be checked against a set of potential valid tags. Semantic information, e.g., a semantic type, of a column can be inferred when a column name matches a valid tag in the set of potential valid tags. However, this mechanism alone can lead to errors or inaccuracies when a field name is misspelled or when data insides a field is invalid, e.g., outside a domain associated with the matched valid tag.

To address data unmatched by column name and/or to verify accuracy of a matched tag, additional processing can be performed on the data in a column. For instance, a sample of data in the column can be extracted to evaluate a format of the data by pattern matching with a set of known data patterns. In a non-limiting, example, data having the form xxx-xxx-xxxx or (xxx) xxx-xxxx, where the x's represent arbitrary numeric digits, can be recognized a telephone number. In some cases, format checking may not provide a definitive result. For instance, a column of city names can be pattern matched as strings, but further details can be difficult to obtain since city names do not possess common or inherent formatting restrictions. However, in such cases, format checking can facilitate further semantic analysis and/or identification of semantic type by eliminating possible semantic types which do not conform to the evaluated format. For instance, phone numbers, latitude, longitude, dates, ages, and other numeric types can be eliminated as possible semantic types when the format is evaluated to be strings. A user can be presented with a list of possible semantic types providing string data such as, but not limited to, city names, first names, country names, region names, business names, and the like. In addition, the list of possible semantic types can be employed to select data sets having known semantic types to be employed as reference data sets for value checking in accordance with another embodiment.

In value checking, a sample of a data in a column of a data set can be matched against a reference data set associated with a candidate semantic type. The reference data set can be queried to determine whether values of the sample are contained therein. One or more thresholds can be established to facilitate distinguishing between a definitive match, e.g., the column of the data set include data of the candidate semantic type, a definite mismatch, and a nebulous result. For example, a 100% validation, e.g., every value in the sample is in the reference data set can be classified as a definitive match. In another example, a nebulous result can be forwarded to a user for verification, correction, or override.

In another embodiment, semantic information associated with columns of data sets in the unified repository facilitates instant discovery of join points between data sets, which can be leveraged to generate interesting mash-ups of data sets. In an example, a first data set comprising crime statistics can include crime rates by city can be joined with a second data set comprising real estate information by city along the overlapping city field. As semantic information of more fields of data sets is generated as described above, the system can continuously learn new correlations between the data sets can be derived to increase value of the underlying data.

In addition, the correlations, and mash-up data itself, can be visualized and displayed in connection with a user interface. For instance, a graph display with nodes representing data sets in a repository can be presented to a user. When a user selects a node, e.g., data set, links can be drawn between the selected node and other nodes, e.g., data sets, where correlations have been derived. In another example, a user can select a link between data sets to obtain a visualization of the mash-up, e.g., a generated data set produced as a join of the two disparate data sets.

FIG. 1 is a flow diagram illustrating an exemplary non-limiting embodiment for determining semantic information associated with a data set. In a specific, non-limiting example, the data set can be included in a data repository managed and exposed by an information-as-a-service system. However, it will be appreciated that private data sets can utilize embodiments disclosed herein to generate semantic information and/or interesting mash-ups in an automatic manner with reduced human input.

At 100, one or more field names, e.g., column names, of fields or columns in a data set are compared with a list of potential valid tags. The potential valid tags include field names, column names, data labels, tags, or the like, which have a known semantic meaning or type. Semantic information of the one or more fields or columns in the data set can be inferred based upon a match to a valid tag in the list. However, further processing can be performed to refine or validate the semantic information generated from a field name check. For instance, at 110, a format of the one or more fields of the data set is identified. By way of example, phone numbers are a type numerical data that can be relatively identified as such, despite variations such as area code parentheses, dashes, etc. Accordingly, semantic information can be inferred from format checks for phone numbers, social security numbers, calendar dates, time stamps, etc. In other cases, while format checking may not definitively identify a meaning or type of data in the data set, it can reduce a number of potential candidates by eliminating data types not associated with the identified format. For instance, format checking can narrow a number of potential candidate semantic types which are tested by value checking.

At 120, actual values of the one or more fields of the data set are checked against at least one reference data set. Reference data sets include known semantic information, e.g., the data has a known semantic type or meaning, which can be queried to determine if values of the one or more fields correspond to the known semantic type. At 130, semantic types associated with the one or more fields of the data set are determined The semantic types can be determined based upon the field name check, the format evaluation, and/or the value check. In addition, the semantic types can be reported to a user for confirmation, or as part of a visualization of the data set.

It is to be appreciated that the above described process can occur in an automated fashion without user interaction. However, in another embodiment, a user can be prompted, at various steps in the process, to confirm determined semantic information (or partial semantic information determined thus far), to request further processing, to address inconsistent formats or values, to override the process, or to alter guessed semantic information. For instance, in one example, the user can be prompted to verify close matches during the field name check, e.g., field name is "_fname" and the list of valid tags includes "_name" or "name." In another example, the user can be prompted to accept or correct values not found within the at least one reference data set. For instance, the value is not found due to a typographical error in the data set, which would be recognized by a user. Accordingly, user input can be utilized to supplement and/or verify inferences.

Figure 2:
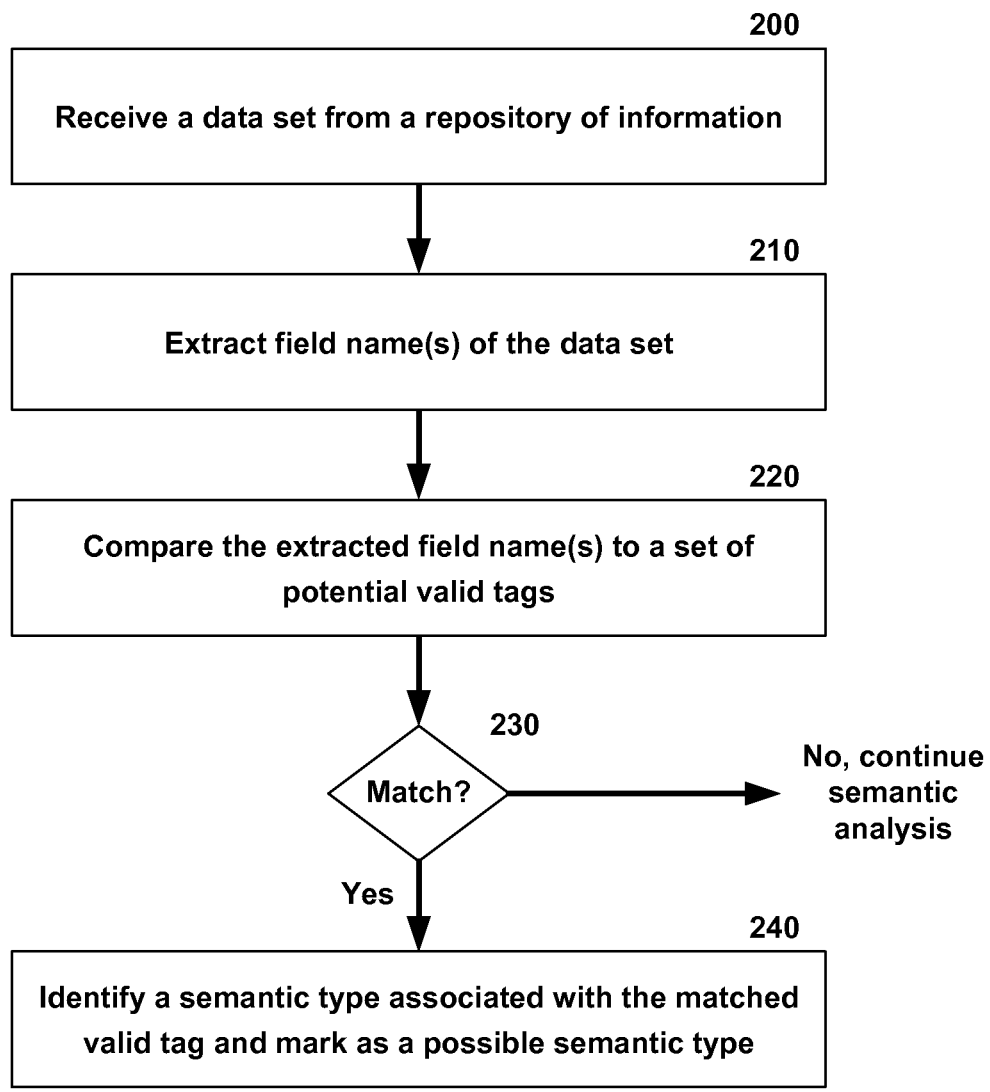
FIG. 2 is a flow diagram illustrating an exemplary non-limiting embodiment for checking field names of a data set against potential tags with known semantic types.

FIG. 2 is a flow diagram illustrating an exemplary non-limiting embodiment for checking field names of a data set against potential tags with known semantic types. At 200, a data set from a repository of information, e.g., an information-as-a-service system, is received. At 210, one or more field names of the data set are extracted. At 220, a comparison, e.g., a string comparison is performed between the extracted field names and a set of potential valid tags. The set of potential valid tags include possible labels or names of data fields, wherein a semantic meaning of the tags or a semantic type of the data fields is known. The set of potential valid tags can be populated with field names encountered during previous semantic analyses on disparate data, field names commonly employed for data sets, tags supplied by a user, or the like. At 240, a determination can made if there is a match between the one more field names and a valid tag in the list. If there is not a match, semantic analysis can continue utilizing different mechanisms or a user can be prompted to intervene. If there is a match, then, at 240, a semantic type associated with the matched valid tag is identified and flagged as a possible semantic type for the one or more fields associated with the one or more field names.

Figure 3:
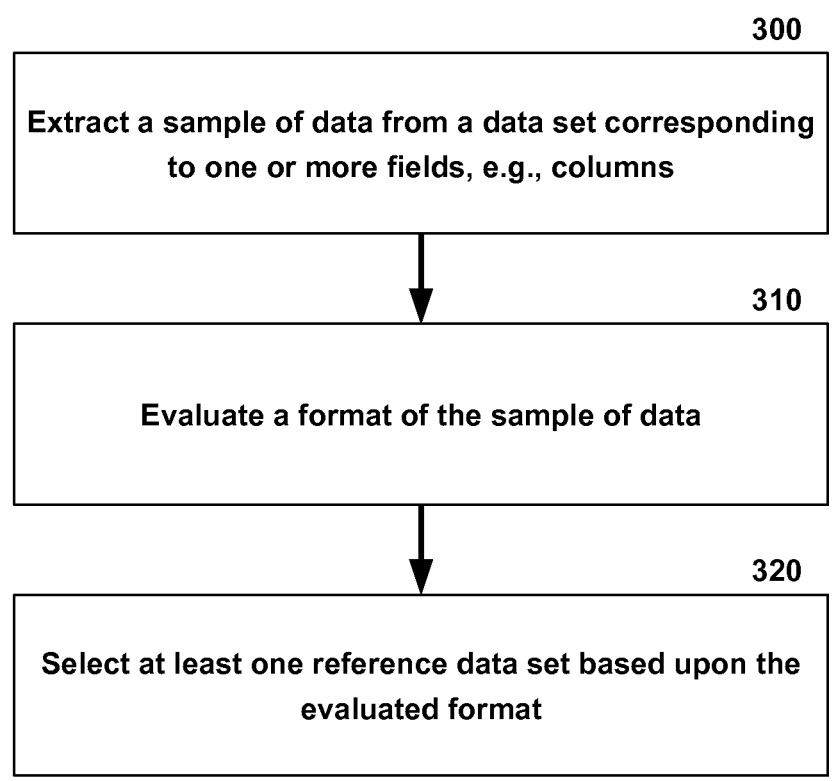
FIG. 3 is a flow diagram illustrating an exemplary non-limiting embodiment for selecting a reference data set based upon a format of a sample information extracted from a data set.

FIG. 3 is a flow diagram illustrating an exemplary non-limiting embodiment for selecting a reference data set based upon a format of a sample information extracted from a data set. At 300, a sample of data from a data set corresponding to one or more fields, e.g., columns, of the data set. The sample of data can be extracted randomly, or a first N entries or rows of the data set, a last N entries, or a middle N entries can be extracted, where N is an integer greater than or equal to one. In another embodiment, the sample of data can include an entirety of the data set. At 310, a format of the sample of data is evaluated. In an example, each value of the sample of data can be matched against patterns to determine a data type, e.g., strings, numbers, mixed type, etc., and/or a possible semantic type, e.g., telephone numbers, dates, proper nouns, etc. For instance, values can be determined to be a mixed type confirming to at least one format such as MM/DD/YYYY, MM-DD-YYYY, or the like. Accordingly, it can be determined that the sample of data includes dates. In another example, it can be identified that the values includes strings beginning with capital letters, i.e., proper nouns.

At 320, at least one reference data set can be selected based upon the evaluated format. In some situations, an accurate semantic type can be inferred from the evaluated format. For instance, semantic types associated with distinct formats, e.g., dates, times, telephone numbers, etc., can be inferred directly from the evaluated format and additional verification, e.g., value checking, can be avoided. However, it will be appreciated that, even data with easily recognizable formats, can be associated with a variety of semantic types. For instance, social security numbers, employee identification numbers, employer identification number, or the like can exhibit similar representations in data sets. However, since such disparate data have different meanings and context, further refinement or verification. As such, reference data sets including employer identification numbers, employee identification numbers, etc. can be selected.

In another aspect, other formats, such as strings, can narrow a pool of possible semantic types, but not provide a definitive solution. Accordingly, a set of reference data sets corresponding to the narrowed pool of possible semantic types can be selected. For instance, if the evaluated format indicates the data set includes proper nouns, data sets of proper names, e.g., city names, country names, first names, last names, business names, etc., can be selected.

Figure 4:
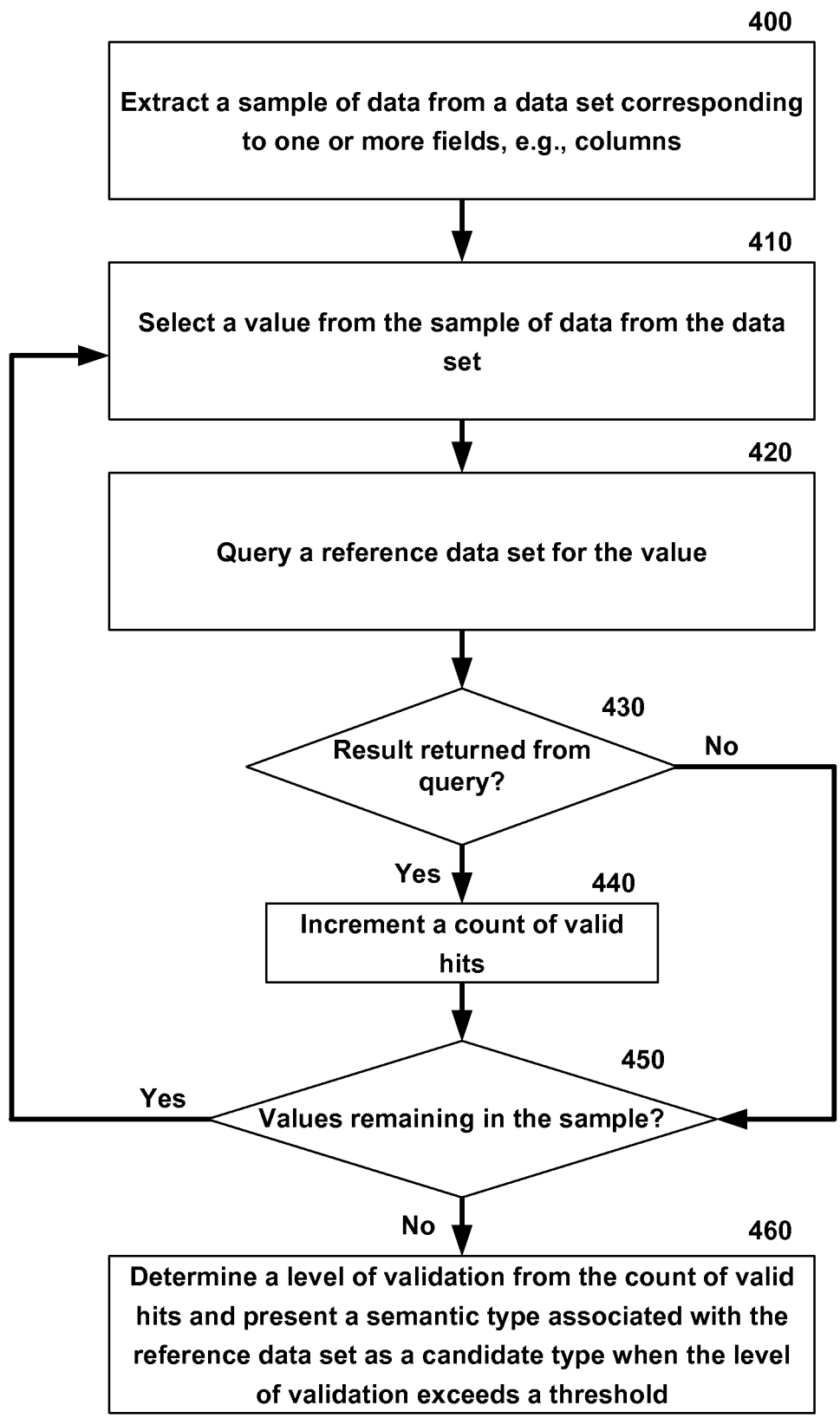
FIG. 4 is a flow diagram illustrating an exemplary non-limiting embodiment for checking values from a sample of data against a reference data set.

FIG. 4 is a flow diagram illustrating an exemplary non-limiting embodiment for checking values from a sample of data against a reference data set. The reference data set can be selected as a result of format checking as discussed above or selected by a user as part of an interactive semantic analysis process. At 400, a sample of data from a data set corresponding to one or more fields, e.g., columns, of the data set. The sample of data can be extracted randomly, or a first N entries or rows of the data set, a last N entries, or a middle N entries can be extracted, where N is an integer greater than or equal to one. In another embodiment, the sample of data can include an entirety of the data set. At 410, a value from the sample of data is selected. At 420, a reference data set is queried to ascertain whether the selected valued is included. At 430, a check is made as to whether a result of the query is returned. If yes, a count of valid hits is incremented at 440. If no, or after the incrementing at 440, a determination is made, at 450, whether or not additional values remain in the sample. If yes, another value is selected at 410 and steps 420-450 can be repeated.

At 460, a level of validation can be identified from the count of valid hits, for example, as a percentage of hits relative to a size of the sample. In addition, semantic information, e.g., a semantic type of the sample, can be inferred based upon the level of validation. In an embodiment, the semantic type of the reference data set can be adopted as a semantic type of the data set from which the sample is extracted when the level of validation reaches or exceeds a threshold. In a specific, non-limiting example, the threshold can be 100%, such that the semantic type is adopted only when all values are validated. In another example, when a level of validation is below 50%, the data set can automatically classified as unrelated to the semantic type of the reference data set. In yet another example, a user can be prompted to confirm a hypothesized semantic type for the data set when the level of validation exists between 50% and 100%. However, it is further appreciated that such user input can be sought for any level of validation, or any level of validation which is not 100%. For instance, a data set can indeed contain city names, but do to limitations of the reference data set, have a low level of validation, i.e., the reference data set does not contain the city names in the sample. The user can override and establish city names as the semantic type of the data set. Further, the system can supplement the reference data set with the new city names learned. In this manner, the system can continue to learn and expand its reference knowledge to provide better and better inferences in the future.

Figure 5:
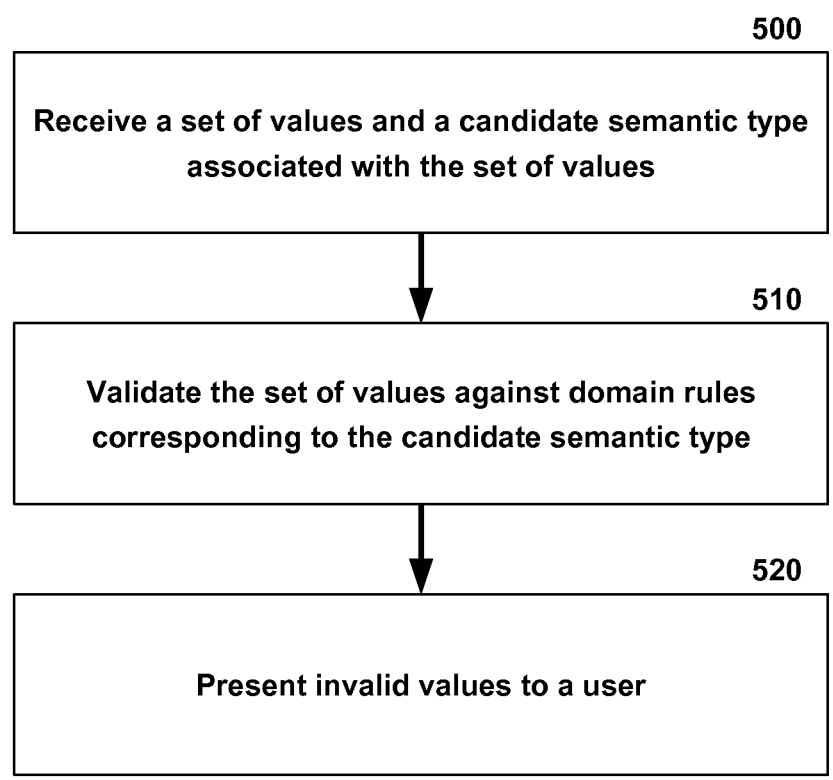
FIG. 5 is a flow diagram illustrating an exemplary non-limiting embodiment for performing a domain check on a set of values associated with a semantic type.

FIG. 5 illustrates a flow diagram illustrating of an exemplary non-limiting embodiment for performing a domain check on a set of values associated with a semantic type. At 500, a set of values, e.g., a sample of data set or an entirety of a data set, and a candidate semantic type inferred from the set of values is received. At 510, the set of values are validated against domain rules corresponding to the candidate semantic type. For example, consider a semantic type of Earth latitudes. A valid latitude can range from +90° or 90° N, e.g., the North Pole, to −90° or 90° S, e.g., the South Pole, with 0° corresponding to the equator. A value of 137 exceeds the valid range and is flagged as invalid. At 520, invalid values are presented to a user for correction, acceptance, override, dismissal, etc.

Figure 6:
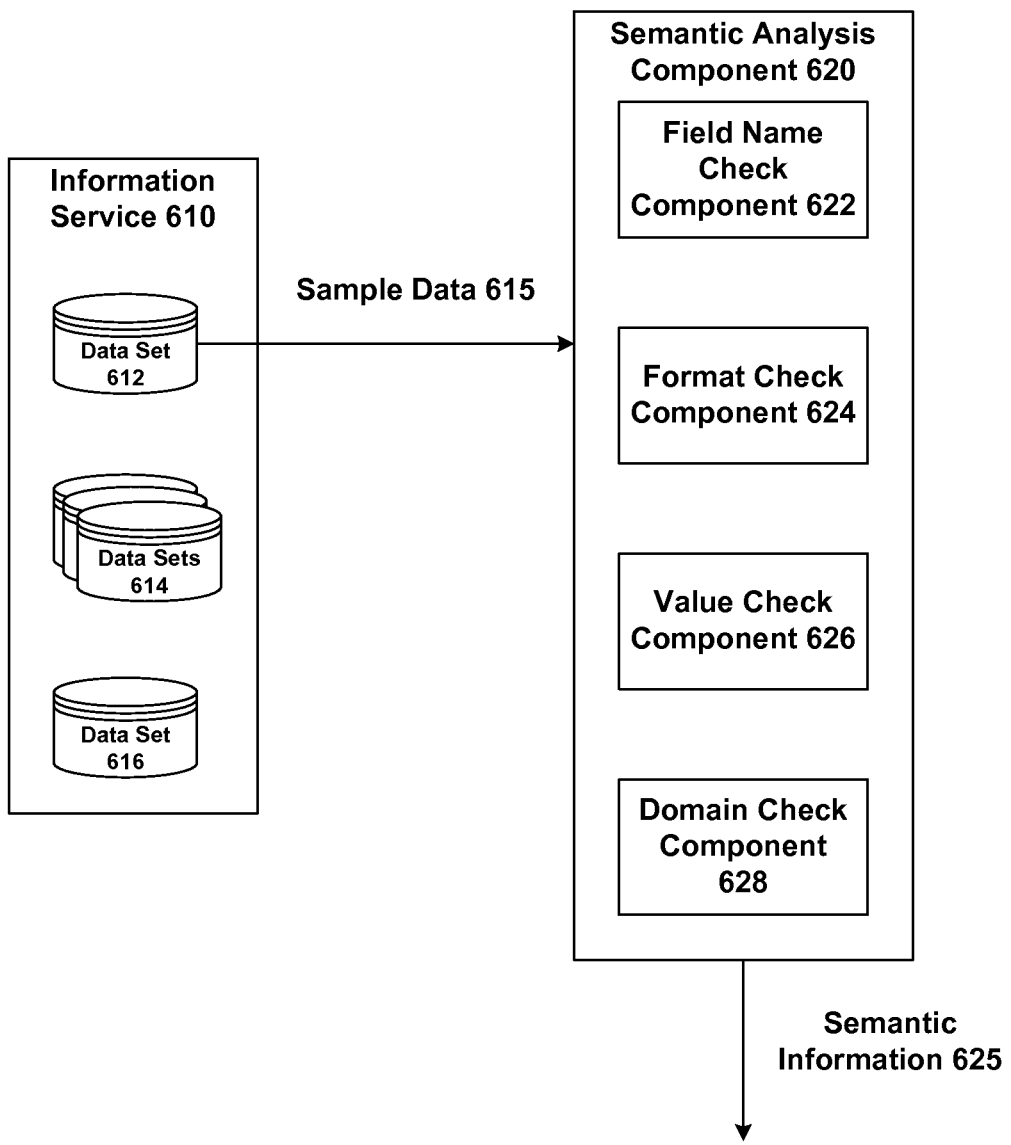
FIG. 6 is a block diagram illustrating an exemplary non-limiting act of inferring semantic information from published data sets in an information-as-a-service system.

FIG. 6 is a block diagram illustrating an exemplary non-limiting act of inferring semantic information from published data sets in an information-as-a-service system. As illustrated in FIG. 6, an information service 610, e.g., an information-as-a-service system or information provided as a service from any platform can include a data set 612, data sets 614, and a data set 616. In an embodiment, publishers, e.g., content providers, can publish the data sets to the information service 610, essentially, without restriction as to form. As such, semantic information, e.g., meanings and types of data, can be missing from the published data sets. In this regard, FIG. 6 shows a semantic analysis component 620 that acquires sample data 615 for at least one data set in the information service 610 to infer semantic information 625 based thereupon. While FIG. 6 depicts sample data 615 extracted from data set 612, it is to be appreciated that such depiction is merely illustrative and exemplary for purpose of explanation and that semantic analysis component 620 can extract sample data 615 from data sets 614 and/or data set 616.

In an embodiment, semantic analysis component 620 can include various components configured to implement a variety of inference mechanisms. For instance, semantic analysis component 620 can include a field name check component 622 configured to implement a comparison of field names in sample data 615 with a set of tags having known semantic information. Further, semantic analysis component 620 can include a format check component 624 configured to identify and evaluate a format associated with sample data 615. In one embodiment, the format can facilitate selection of reference data sets employed by a value check component 626 configured to validate values in sample data 615 against one or more reference data sets corresponding to known semantic types. In a further embodiment, semantic analysis component 620 can include a domain check component 628 configured to verify that values in sample data 615 conform to domain rules associated with a particular semantic type.

Figure 7:
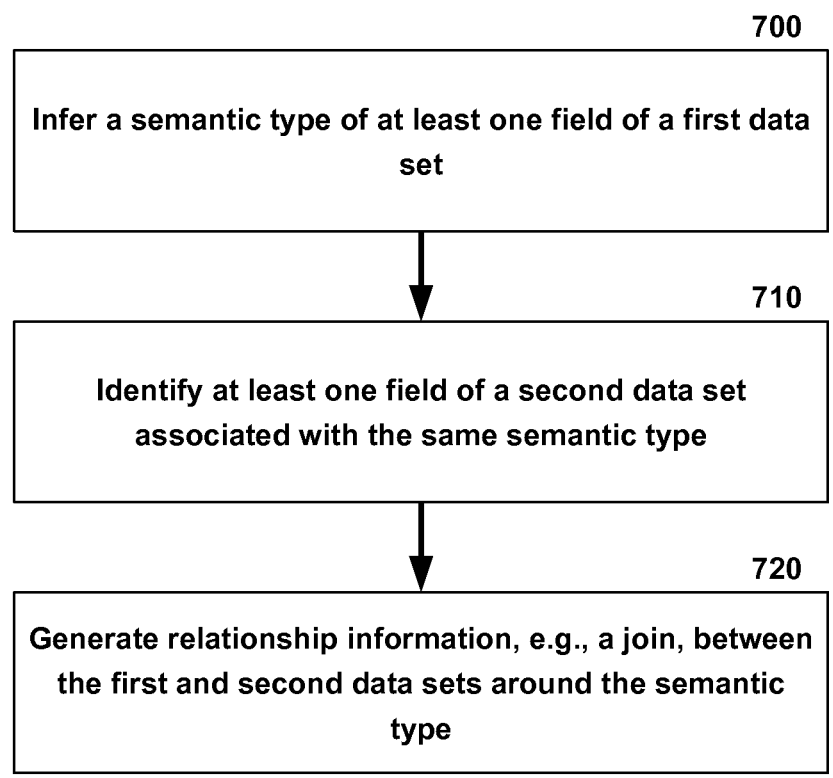
FIG. 7 is a flow diagram illustrating an exemplary non-limiting embodiment for utilizing semantic information to correlate disparate data sets.

According to a further embodiment where mash-ups of information in various data sets can be systematically generated based upon semantic information, FIG. 7 is a flow diagram illustrating an exemplary non-limiting embodiment for utilizing semantic information to correlate disparate data sets. At 700, a semantic type of at least one field of a first data set is inferred. For instance, the mechanisms described above can be employed on the first data set to determine the semantic type of the at least one field. At 710, at least one field of a second data set is identified, wherein the at least one field is associated with the same semantic type. For instance, the first data set can include a field of city names and a field of the second data set can be identified that also includes city names. At 720, relationship information, e.g., a join, between the first and second data sets, around the semantic type, can be generated. The relationship information can be employed to correlate disparate data sets. In addition, the relationship information can be utilized to query the disparate data sets to obtain hybrid data from multiple data sets.

Figure 8:
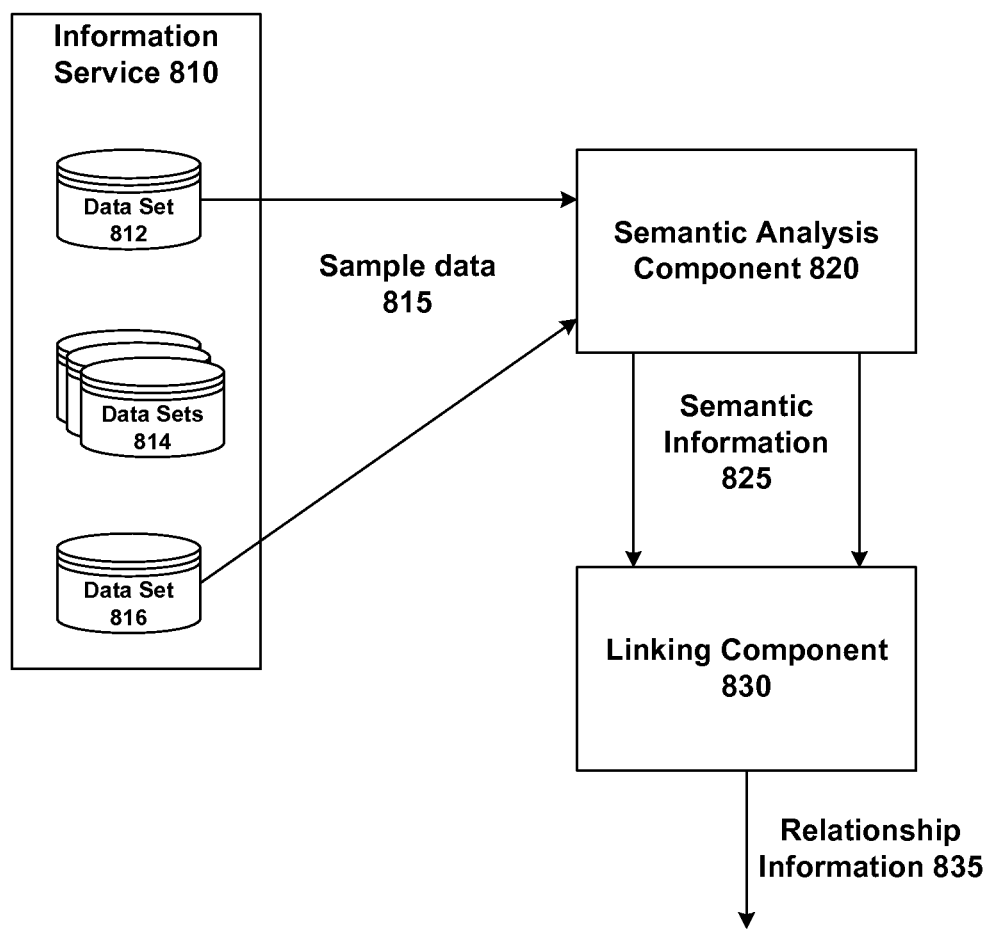
FIG. 8 is a block diagram illustrating an exemplary non-limiting act of generating relationship information between data sets provided in an information-as-a-service system.

FIG. 8 is a block diagram illustrating an exemplary non-limiting act of generating relationship information between data sets provided in an information-as-a-service system. As shown in FIG. 8, an information service 810, e.g., an information-as-a-service system or information provided as a service from any platform can include a data set 812, data sets 814, and a data set 816. A semantic analysis component 820 can extract sample data 815 from one or more data sets, such as data set 812 and data set 816 in a non-limiting and illustrative example. The semantic analysis component 820 is configured to infer semantic information 825 from sample data 815 extracted from data set 812 and data set 816. Semantic information 825 can specify a semantic type or a semantic meaning of one or more fields in data set 812 and data set 816.

In an embodiment, a linking component 830 configured to identify, based upon semantic information 825, fields of disparate data sets having identical semantic types. For instance, as indicated by semantic information 825, data set 812 and data set 816 can respectively include fields of state names. Linking component 830 is configured to generate relationship information 835 that associates data set 812 and data set 816 by the respective fields of state names.

Figure 9:
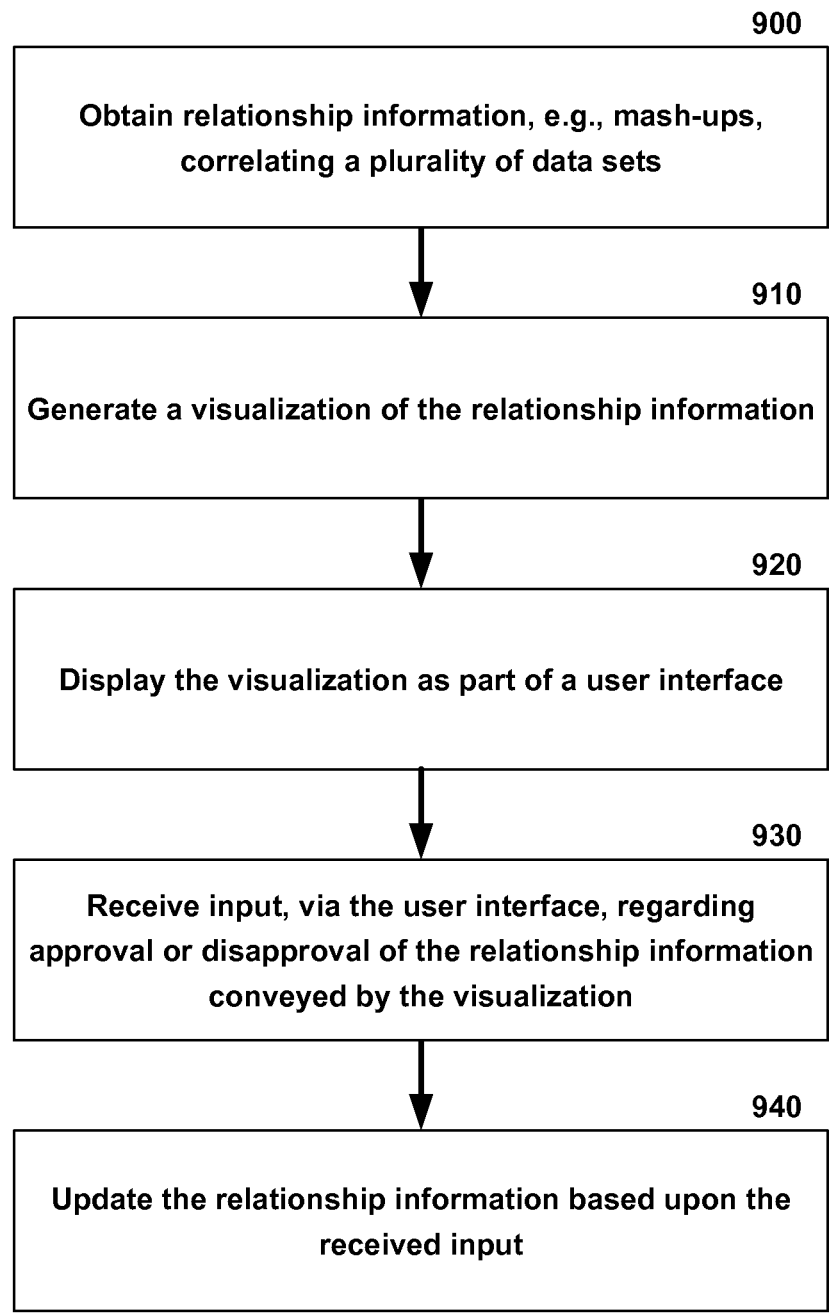
FIG. 9 is a flow diagram illustrating an exemplary non-limiting embodiment for visualizing relationships between data sets of an information-as-a-service system.

In accordance with another embodiment, where a visualization of correlations between data sets can be displayed, FIG. 9 is a flow diagram illustrating an exemplary non-limiting embodiment for visualizing relationships between data sets of an information-as-a-service system. At 900, relationship information, e.g., a mash-up, correlating a plurality of data sets is obtained. The relationship information can specify a field of the plurality of data sets at which the plurality of data sets can be joined. At 910, visualization can be generated based upon the relationship information. In a non-limiting embodiment, the visualization can be a graph with nodes representing data sets and edges representing links e.g., correlations or relationships, identified between the data sets. At 920, the visualization is displayed as part of a user interface. At 930, input is received, via the user interface. The input can relate to approval or disapproval of the relationship information conveyed by the visualization. At 940, the relationship information is updated based upon the received input.

Figure 10:
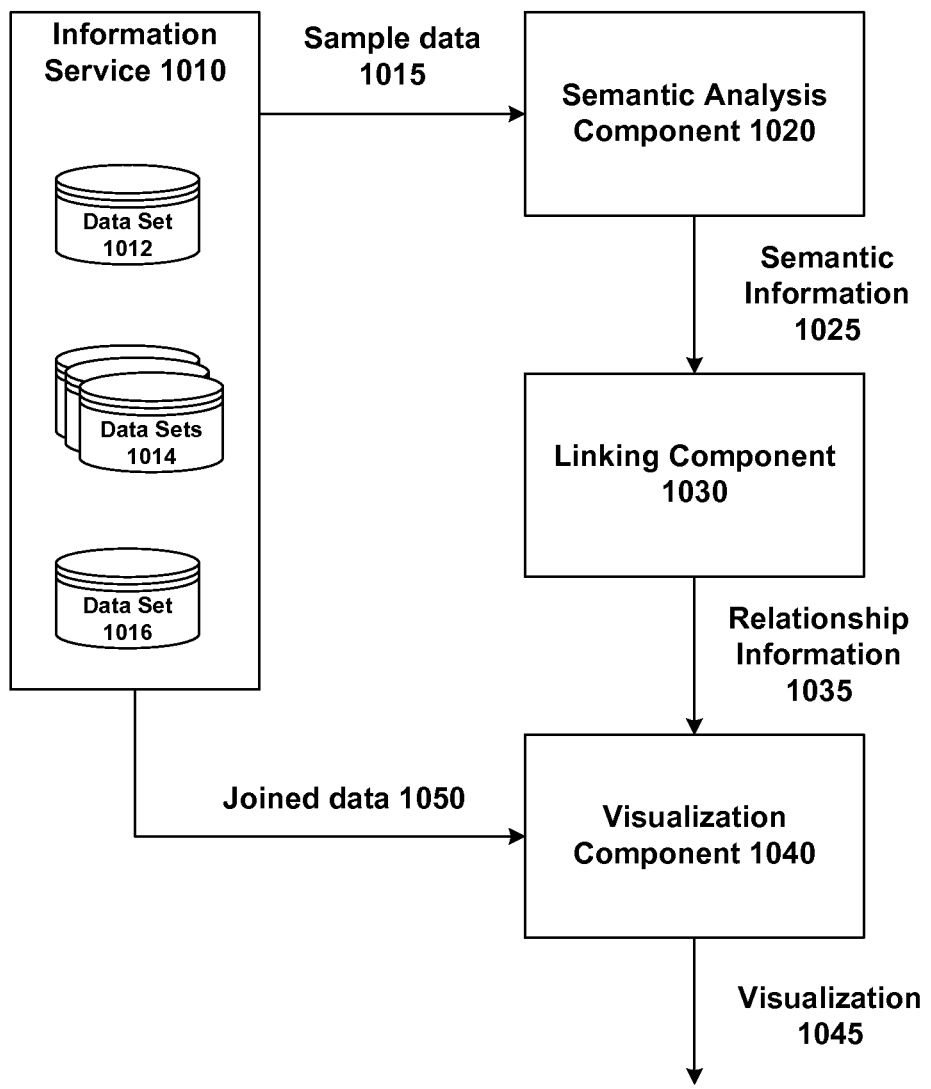
FIG. 10 is a block diagram illustrating an exemplary non-limiting act of generating visualizations of data set relationships and mash-ups in connection with an embodiment of an information-as-a-service system.

FIG. 10 is a block diagram illustrating an exemplary non-limiting act of generating visualizations of data set relationships and mash-ups in connection with an embodiment of an information-as-a-service system. As shown in FIG. 10, a semantic analysis component 1020 can extract sample data 1015 from an information service 1010 that includes data set 1012, data sets 1014, and data set 1016. The semantic analysis component 1020 produces semantic information 1025, which can be employed by a linking component 1030 to infer relationship information 1035. In an embodiment, the relationship information 1035 can be provided to visualization component 1040 configured to generate a visualization 1045. In a further embodiment, visualization component 1040 can query information service 1010, based upon the relationship information 1035, to acquire joined data 1050 representing the correlation of a plurality of data sets. The joined data 1050, in an aspect, can be displayed separately or in connection with the visualization 1045 in a user interface.

Figure 11:
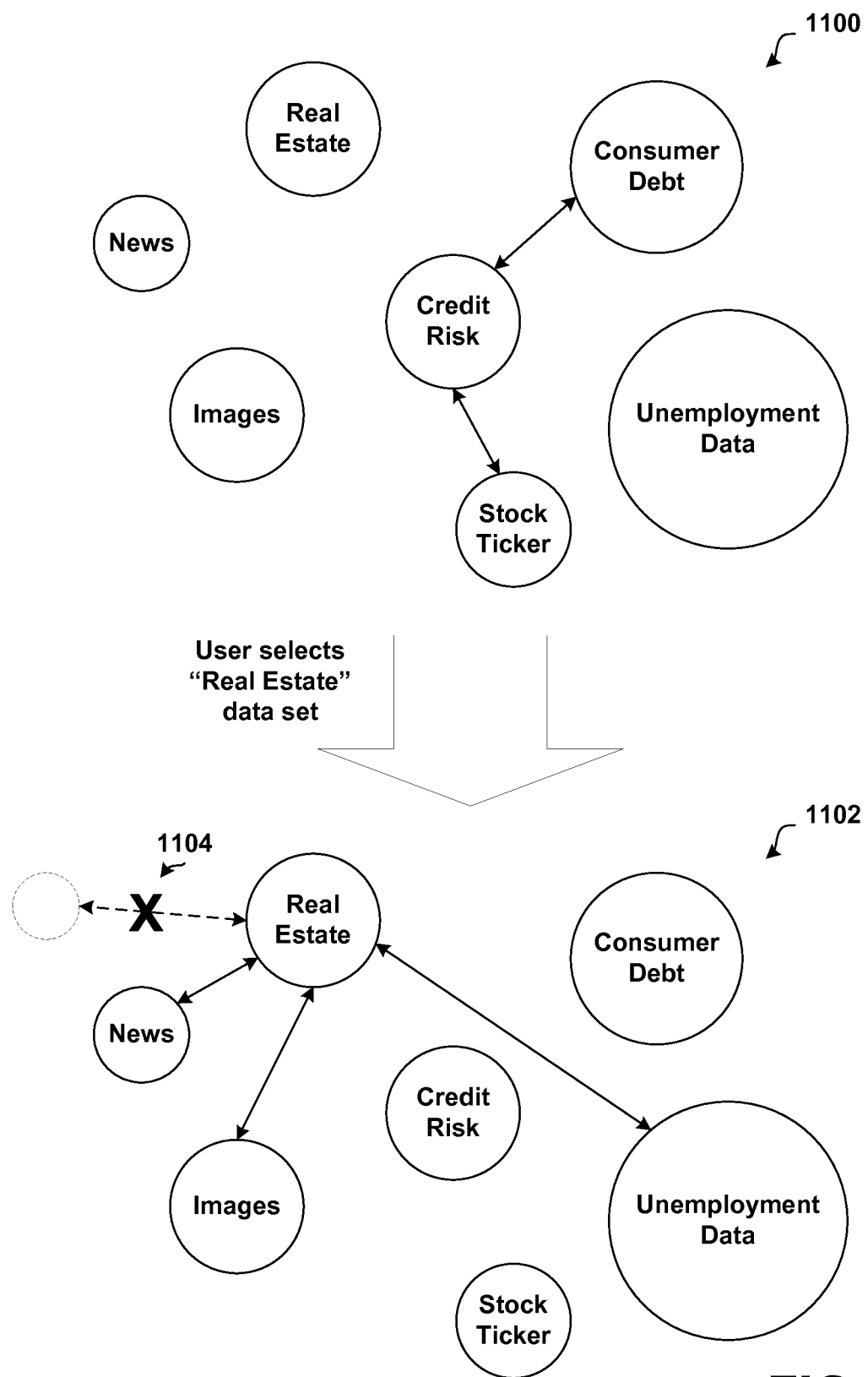
FIG. 11 is a an exemplary non-limiting illustration of a visualization of relationships between data sets in connection with an embodiment of an information-as-a-service system.

FIG. 11 is an exemplary non-limiting illustration of a visualization of relationships between data sets in connection with an embodiment of an information-as-a-service system. The visualization can be incorporated into a user interface that accepts user input. In a first, non-limiting example, a user can select a data set in the visualization to generate a first screen 1100. As shown in the first screen 1100, a plurality of data sets is depicted as nodes. A user can select a credit risk node (data set) to generate a visualization of the mash-ups available. As shown in FIG. 11, the credit risk data set correlates with a consumer debt data set and a stock ticker data. In a second, non-limiting example, the user can select a real estate data set to generate a second screen 1102. As seen in second screen 1102, the real estate data set is correlated with an unemployment data data set, an images data set, a news data set, and another data set. In another embodiment, the user can select a link 1104 to cancel or delete the association.

Building Semantics and Access API(s) in Connection with Information as a Service The following description contains an alternative, non-limiting embodiment to build semantic information in connection with information as a service. As mentioned, in the context of information as a service, there are a finite number of things that may be represented in data sets (phone numbers, city codes, address, city, state, zip code, etc.) which can be inferred either the name of the column, or by weighted matching algorithms on the data itself (e.g., the 1st thousand things). For important data, while a human can be brought in to classify the data, for large amounts of data, such conventional human classification does not scale well, and if data is re-published by a publisher with different semantics, the human characterization may already be out of date.

Accordingly, in various embodiments, random samples resulting from querying a data set are analyzed to determine if the type of data can be inferred. For instance, a content provider provides a set of poorly described data, e.g., according to a proprietary schema. Based on or in response to a data request received over the data, a set of samples can be extracted from the data set for application of a set of algorithms to infer semantic meaning of the data, e.g., inferring data type or column name based on clues in the data or column name, or other column names. Since the publisher generally will not want his or her data that is published altered, a set of augmented semantics, e.g., mappings, can be maintained by the system to describe the inferences made by the system, e.g., _x=latitude for the earlier example. In this regard, as a result, the next developer is given more information about querying that data set, in which case more joins, filters, etc. can be performed with other data sets having a longitude column, and in addition, the access APIs themselves which previously included "_x( . . . )" as part of the syntax can be updated to "latitude ( . . . )" making the access APIs self-descriptive over time to further aid developers. In one example, the query APIs are implemented via URLs, e.g., OData, more information about which can be found below.

In one embodiment, weighted algorithms based on known distributions of data, such as the age spread of a given population, can be used to determine probabilistically what a given set of data or column name represents, e.g., determine that a set of floating point numbers represents age.

In this way, without making it more difficult to publish data as is, certain conventions such as phone numbers and addresses can be enforced on the content providers through indirection, e.g., maintenance of semantic mappings. This way, content providers are encouraged to publish, but consumers still benefit from a sense of uniformity over the data. For instance, phone numbers are an example of numerical data that can be relatively easily identified as such, though variations such as area code parentheses, dashes, etc. exist. Standardizing this representation through semantic mappings based on inferences makes consumption of this data by developers and subscribers easier, in addition to adapting the access APIs over time to be more and more self-descriptive, e.g., re-naming a column "PN" as "phone numbers" or something else more descriptive.

In addition, the publisher can choose to participate as well. While the publisher is not required to participate, at upload time, the system can make inferences and ask the publisher to verify the inferences so that mapping information and descriptive access APIs can be exposed from the outset. For instance, as the system infers a publisher is uploading salary information, the system can ask the publisher if that is net salary or gross salary being represented.

The augmented semantics enables two smaller tables, which were previously uncorrelated, to be joined, merged, filtered, etc. where it is inferred that they contain similar tables, columns, data types, etc. despite initially disparate semantics.

A variety of algorithms can be used to infer information about semantics, e.g., weighted matching techniques can be employed, manual review of a subset of query results, community review of the subset of query results (e.g., like Wikipedia approval), assignment of data quality scores, shipping data for a column separately from the data. As mentioned, in addition to inferring what data represents, the data can be "cleaned up" as well. For instance, time is represented in many different formats, and it may be known that a given column represents time; however, converting such different formats to a universal time format has benefits in connection with cross data set operations. As discussed, phone numbers and addresses are another example of information that can be standardized across different representational formats.

Also, a subset of random samples can be taken out of actual result sets to make such inferences, and thus the system can improve over time as additional queries are made and the sample population becomes more numerous and diverse. The name of a column may be dispositive or informative as well, e.g., if a column is named citcode, the system in essence knows what is being represented. Any of or multiple of the above techniques can be applied hierarchically to infer such additional semantic information. In this regard, being able to achieve such semantic update through the mechanism of access API calls, instead of handling the problem purely by examining the data set as a whole as published by the publisher database problem, enables dynamic update as well as a system that becomes more accurately descriptive over time, within the syntax of the API calls themselves as they begin to reflect the learned information.

As discussed, data can be uploaded through URLs via open data protocol in connection with information as a service from any platform. Based on what consumers are requesting, inference of the data can be performed by checking the way the data is named and based on the actual data set that is returned. As a result, with the better name next time, the APIs (as represented by the URLs) are automatically updated so that next time the semantics of a query that said http://dallas/. . . /_a(SEA) could better read http://dallas/. . . /City (Seattle) next time. In other words, keep building logical semantics over the data as it is requested and processed through the URLs to not only determine mappings between columns, but to improve the semantics of the URL or access API more generally.

Supplemental Context for Information as a Service

The following description contains supplemental context regarding potential non-limiting infrastructure, architectures and/or associated services to further aid in understanding one or more of the above embodiments. Any one or more of any additional features described in this section can be accommodated in any one or more of the embodiments described above with respect to updating of data set semantics and corresponding access APIs for information as a service from any platform. While such combinations of embodiments or features are possible, for the avoidance of doubt, no embodiments set forth in the subject disclosure should be considered limiting on any other embodiments described herein.

By way of some additional background, today, while information can be obtained over networks, such as the Internet, today's offerings tend to the proprietary in terms of access and framework, and are thus limited in terms of third party provider participation. For instance, currently, there is no adequate business model for commercial content providers to publish their data in a way that does not relinquish at least some of the value of such commercial content, and thus historically, owners of valuable content have tended to expose that content through limited proprietary means. Or, in instances where storage of such content is provided by secure cloud storage providers, there is little value in storage alone when a consumer must wade through thousands of tables to potentially find an item of interest. In addition, even where cloud storage providers attempt to collect data from various providers, at best such providers can boast a modest, small or incomplete catalog of data.

Much of the stunting of potential growth in this area has been the result of mistrust over handling and IP (e.g., copyrights). In short, big players don't trust cloud providers with crown jewels because a single compromise can end the value of the data. In addition, such cloud providers to date have had a weak position with respect to information workers who wish to extract value from such data for their informational needs, and in addition, due to the proprietary nature of such systems, developers have thus far had limited ability to expand tools for developing informational capabilities.

Accordingly, as described for one or more embodiments, an infrastructure for information as a service is provided that accommodates all classes of individuals: publishers, developers, information workers, and consumers. The infrastructure enables information discovery, e.g., the ability to discover, acquire, and consume structured and blob datasets to power any application—on any platform and any form factor (e.g., any screen size). The infrastructure further enables brokerage business, e.g., a partner driven ecosystem and global reach to deliver data and functionality to developers and information workers. The infrastructure also allows analytics and reporting, e.g., a single click analysis to augment private data with public data. In this regard, due to the open nature of various implementations of the infrastructure, any application developer can develop mobile, cloud, and/or desktop applications to facilitate the publishing, processing, querying and/or retrieval of data.

To write applications, one can register for account information (e.g., sign in with Live ID) and be provided with an account key by which to access the "blob" via structured and real-time web services enabled for the infrastructure for information as a service as described for one or more embodiments herein. In one aspect, developers can explore the APIs visually before coding begins. For instance, a service explorer module or set of modules can be used by developers to visually construct representational state transfer (REST) API queries and preview the content according to a variety of packages, such as, but not limited to extensible markup language (XML), ATOM, RAW (for blob and real-time content), or in a table view (e.g., for structured data). For example, a developer merely provides his or her account key and selects to preview the content.

Accordingly, developers can build mobile, desktop or service applications on any platform. While resulting REST queries can be copied into a new developer application, the infrastructure for information as a service also enables the ability to consume automatically generated C# proxy classes to eliminate any need to create a local object model or generate and understand the details of XML or web service code. In this regard, in another non-limiting beneficial aspect, a developer can download the proxy classes and include them in the developer's applications to consume service data with as few as a couple lines of code.

In this regard, the various embodiments of an infrastructure for information as a service allow developers and information workers to find, acquire, and consume data in their applications and analytics scenarios instantly, periodically, or over some other function of time specified by the application developer. As mentioned, a developer obtains an account key which then accompanies web services calls to the network services enabling information as a service as described for one or more embodiments herein for content requests and subscribing to the content of interest.

Thus, in one aspect, the account key provided by the infrastructure for information as a service as described for one or more embodiments herein is the developer's private key. This key enables billing and reporting on content used in connection with the developer's applications. As such, this private developer key should not be shared without purpose, and precautions in securing the key should be taken where developing native applications running on mobile or desktop solutions and planning to integrate the key as part of the deployment. For example, cryptographic storage can be used to ensure the key is not cracked.

In addition to the account key, which is used to track the application consuming the content, the unique user ID is a globally unique identifier (GUID) that represents the developer's individual users. This field allows billing for content that is priced on a per-user basis programmatically. For example, if a developer is developing a mobile application with an individual user consuming the application, the developer should return the same GUID each time requests are made on behalf of that individual user. However, if the developer is developing a web portal and issuing web service requests on behalf of a variety of users, it is up to the developer to assign a new GUID for each unique user visiting the portal. For example, each registered user can be assigned a GUID or each IP address/port combination assigned a unique user ID GUID, etc.

While REST APIs can be constructed on any platform to consume content from the infrastructure for information as a service as described for one or more embodiments herein, in one embodiment, proxy classes can be dynamically generated for services in C#. Achieving this is a matter of downloading the object models, adding them to the current developer project, and updating the account and unique user values.

If a developer would like to issue requests manually, an example is provided below, but for any service, the preview function can be used, or the URLs created from the Service Explorer can be invoked as well. An exemplary, non-limiting REST query to a sample dataset is illustrated below. It is noted that some or all calls can be secure socket layer (SSL) secured.

https://api.sqlazureservices.com/UnService.svc/UNESCO(120)

The $accountKey and $uniqueUserId elements are also placed in the header of the request, which appears as follows, for example:

$accountKey={developer account key}
$uniqueUserID={a GUID representing the user}

The value in $accountKey represents the developer's account key, found in the Accounts Tab and the value in $uniqueUserID represents the GUID for the user accessing the service.

The REST APIs described herein provide an exemplary, non-limiting protocol to access and consume content from the infrastructure for information as a service as described. It can be appreciated that other protocols, such as simple object access protocol (SOAP) for web service access or tabular data stream (TDS) for on-premise access and analysis can be employed.

The above example authenticating approach is non-limiting in that other authenticating approaches are also possible, and thus the various embodiments described herein can implement any alternative authentication approaches. For instance, Basic Authorization (RFC 1945), with the AccountKey as the password, or Access Control Server (ACS) using a token based approach, or other token based approaches can be used as well.

Accordingly, the infrastructure for information as a service as described for one or more embodiments herein is a new service or framework allowing developers and information workers to easily discover, purchase, and manage premium data subscriptions in any platform. The infrastructure is an information marketplace that brings data, imagery, and real-time web services from leading commercial data providers and authoritative public data sources, as well as non-authoritative publishers, together into a single or multiple locations that are unified under a common provisioning and billing framework. Additionally, developers and information workers can consume this premium content with virtually any platform, application or business workflow.

Some exemplary, non-limiting scenarios for using the infrastructure for information as a service as described for one or more embodiments herein include: (a) finding premium content to next-generation "killer apps" for consumer and business scenarios, (b) discovering and licensing valuable data to improve existing applications or reports, (c) bringing disparate data sets together in innovative ways to gain new insight into business performance and processes, e.g., aggregation algorithms, (d) instantly and visually exploring APIs across all content providers for blob, structured, and real-time web services and (e) consuming third party data inside existing applications and data base systems, such as existing word processing, spreadsheet, database query systems, etc., for rich reporting and analytics.

Benefits for developers include: (a) trial subscriptions allow content to be investigated and applications to be developed without paying data royalties, (b) simple transaction and subscription models allow "pay as you go or grow" access to multi-million dollar datasets, (c) consistent REST based APIs across datasets facilitate development on any platform, (d) visually building and exploring APIs, previewing results and (e) automatic C# proxy classes provide instant object models and eliminate the need to write tedious XML and web service code.

Benefits for Information Workers include: (a) integration with PowerPivot to easily work with data in existing spreadsheet software such as, but not limited to, Excel, (b) simple, predictable licensing models for acquiring content and (c) the ability to consume data from SQL Server, SQL Azure Database, and other pre-existing assets.

Benefits for Content Partners include: (a) easy publication and on-boarding process regardless of blob data, structured data, or dynamic web services, (b) developer tooling on the selected platform to ease development, e.g., via Visual Studio and .NET or other runtime system development, (c) exposing developer content to global developer and information worker community, (d) content discovery and integration inside pre-existing content consumption applications and (e) a scalable cloud computing platform handles storage, delivery, billing, and reporting on behalf of all parties.

In a non-limiting implementation of the infrastructure for information as a service as described for one or more embodiments herein, some features for Rich Web Services include: (a) secure, REST based model for consuming services across the entire content catalog, (b) dynamic pagination built into the APIs to simplify access, (c) Standard ATOM 1.0 feeds are available for most of the services and (d) consistent billing, provisioning, and usage reporting across all services.

In a non-limiting implementation of the infrastructure for information as a service as described for one or more embodiments herein, some features for a Service Explorer component include: (a) C# proxy classes generated to simplify development, (b) preview of data in tabular form and as a feed, such as an ATOM 1.0 feed, if supported, (c) invocation of the service to understand the results that the compiled service call returns, (d) discovery of documentation and sample values for each of the parameters and (e) instant copying of the visually built URL for a service call into clipboard to ease development.

In a non-limiting implementation of the infrastructure for information as a service as described for one or more embodiments herein, some features for a Marketplace Integration and Discovery Portal component include: (a) discovery of new data across domains including consumers and businesses, (b) management of service subscriptions and usage limits, (c) management of account keys to access the services and (d) detailed access reporting containing the services/datasets that were accessed, grouped by date and by account key.

The infrastructure provides a variety of value propositions for content owners, application developers/ISVs and for information workers and other consumers/subscribers. For content owners, the infrastructure enables monetization from data (for data providers who charge for the data), in addition to social benefits for data providers who do not charge for data, but derive benefit from the publication of such data in other ways. Due to the openness of the infrastructure, content owners enjoy greater availability and reach of data to ISVs and consumers/information workers, and all of this comes at a lower cost, particularly over developing a proprietary model as in the past.

For application developers/ISVs, the infrastructure enables access to data in a consistent format, variable and low-cost pricing model for data access. predictable pricing, profit potential from consumers/IWs using the applications built using the data, broader reach to consumers through any platform and a single billing and data source.

For information workers/consumers, the infrastructure enables added value from applications, consumption of data in current large object (LOB) or IW software, a variable and low-cost pricing model for data access in addition to a single billing and data source.

Accordingly, the infrastructure solves a current customer and developer pain point with a potentially significant revenue upside, creates unique business intelligence opportunities attached with instant data for modeling, reporting, analysis and trending and creates adoption and stickiness for any platform by encouraging data owners to store their data via the infrastructure, thereby differentiating the infrastructure's value proposition when compared with conventional cloud storage environments.

Figure 12:
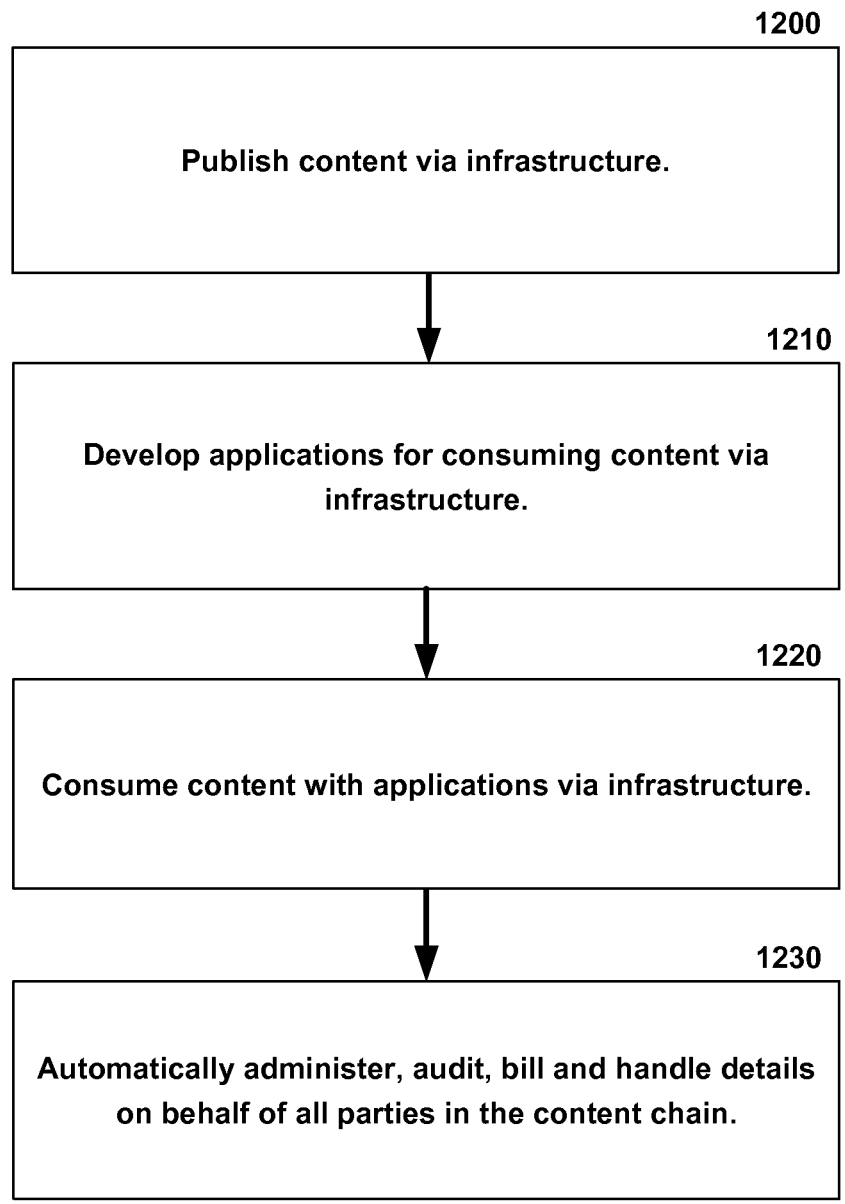
FIG. 12 is a flow diagram illustrating an exemplary sequence for a non-limiting infrastructure for information provided as a service from any platform.

As shown in the flow diagram of FIG. 12, at 1200, described herein are various ways for content owners or publishers to publish data via the infrastructure. At 1210, there are a variety of tools that allow developers to developer applications for consuming the data via the infrastructure. At 1220, consumers or information workers use the applications or can directly query over the data to consume the data. Lastly, the infrastructure provides a rich variety of tools at 1230 that enable automatic administration, auditing, billing, etc. on behalf of all parties in the content chain, enabled by the transaction model.

In this regard, some key parties in the infrastructure include data owners, the application developers/ISVs and the consumers/information workers. In general, data owners are entities who want to charge for data, or who want to provide data for free for other reasons, or enforce other conditions over the data. In turn, application developers/ISVs are entities who want to monetize their application (e.g., through advertising, direct payments, indirect payments, etc.), or provide their application for free for some beneficial reason to such entities. Information workers and consumers are those who can use the raw data, or those who want to use an application provided by the application developers.

Figure 13:
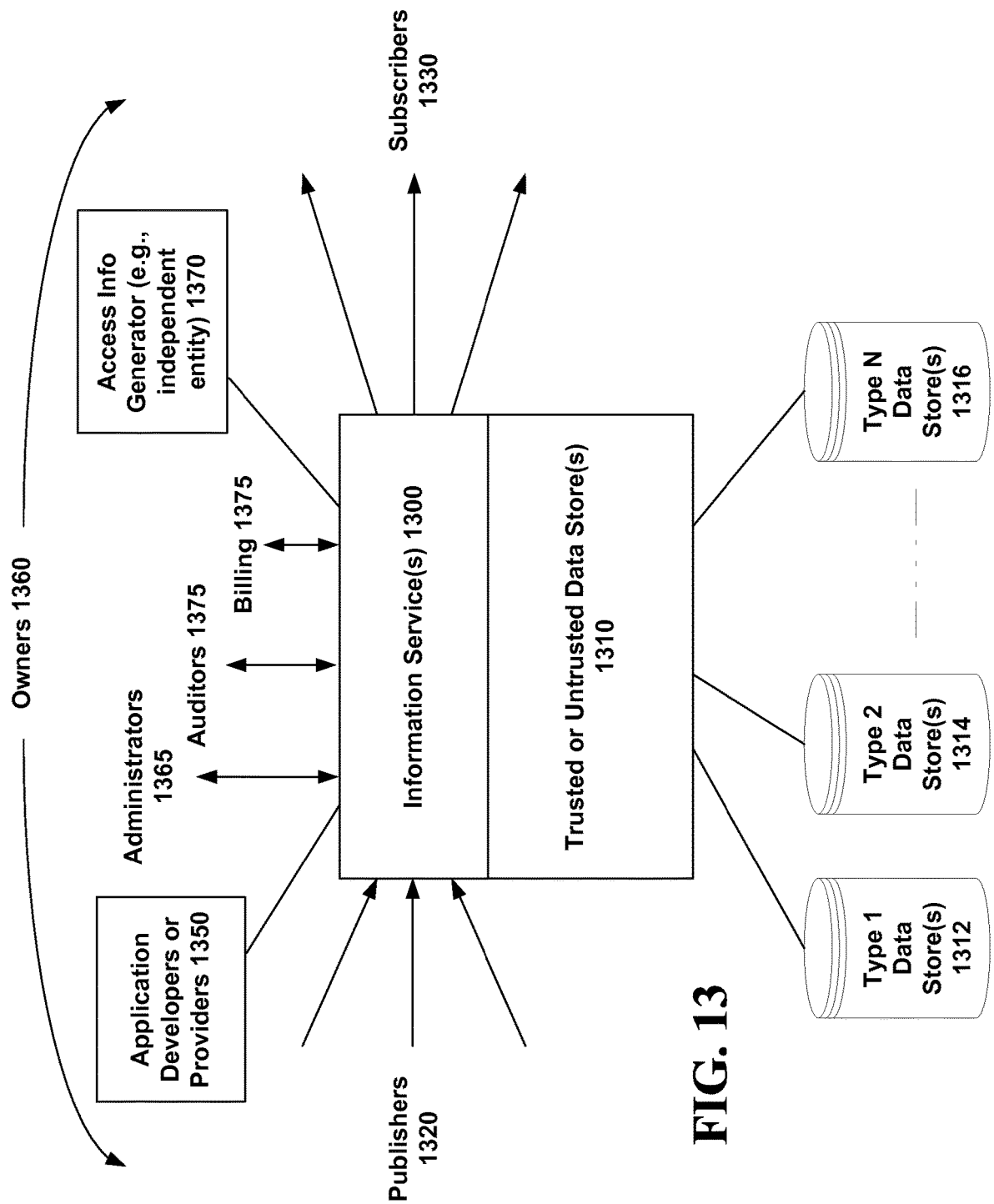
FIG. 13 is a block diagram illustrating an exemplary non-limiting infrastructure for information provided as a service from any platform.

FIG. 13 is a block diagram generally illustrating the various parties that may participate in an ecosystem providing information as a service as described herein. For instance a set of network accessible information services 1300 provide access to a variety of trusted or untrusted data stores 1310, depending on the sensitivity or other characteristics of the data. As shown, thus, what type of data store, 1312, 1314, . . . , 1316 is not so important since the ecosystem supports any kind of data, blob, structured, unstructured, etc. As mentioned, the system includes publishers 1320 that add data to the ecosystem, subscribers 1330 that consume the data and application developers or providers 1350 who help consumption of the data with their applications. An access information generator 1370 can also govern access to the data by various parties through maintaining or enforcing account information, key information, etc. In this respect, content owners 1360 can span any of the roles in that a content owner 1360 can be a publisher 1320, a subscriber 1330 and/or an application developer as well. In one aspect, the common infrastructure for all parties enables administration 1365, auditing 1375, billing 1375 as well as other desired ancillary services to the data transactions occurring across the infrastructure.

In this regard, various embodiments for the user friendly data platform for enabling information as a service from any platform is an infrastructure to enable consumers of data (IWs, developers, ISVs) and consumers of data to transact in a simple, cost effective and convenient manner. The infrastructure democratizes premium (private) and community (public) data in an affordable way to allow IWs to draw insights rapidly, allows developers to build innovative apps using multiple sources of data in a creative manner and enables developers to monetize their efforts on any platform. For instance, the infrastructure supports Pay Per Use as well as Subscription Pricing for Content, Pay for Content ("retail price"—set by content owner), Pay Data Fee ("Shipping and Handling") and BW, and further supports Data fees as a brokerage fee on a per-logical transaction basis (per report, per API, per download, etc.).

For Information Workers (e.g., Office, SQL Server, Dynamics users), the infrastructure supports subscriptions to allow for future EA integration as well as predictable spend requirements (as well as caching to support on and off-premise BI as well as "HPC" workloads). Thus, alternatives include content priced per-user per-month; which may or may not bundle to deliver content packs or per-transaction pricing, e.g., allowing cloud reporting / business intelligence on-demand pricing to eliminate the need to move large amounts of data while allowing per-usage pricing, or vertical apps via report galleries.

For content providers (any data type; any cloud), using any platform, the infrastructure becomes a value proposition to incent sales within any particular desired platform; auto-scaling, higher level SLA possibilities at no additional cost. For some non-limiting examples, data can be secure and associated data in the following domains: Location aware services & data, Commercial and residential real estate, Financial data and services, etc. A non-limiting scenario may include delivery of data to top 30 non-governmental organization (NGO) datasets. In addition, the infrastructure may include the ability to showcase BI & visualization through "Bing for information as a service", HPC, etc. Vertical application opportunities exist as well.

In one non-limiting embodiment, the data brokerage can be analogized to conventional brick and mortar strategies: For instance, capacity can be represented as shelf space (e.g., a mix of structured and unstructured/blob data), cost of goods (COGS) can be represented as square footage, (SA, platform dependency, bandwidth) and content can be represented as merchandise (e.g., optimize content providers to cover COGS, maximize profits from IWs and developers). In various embodiments, an onboarding process can be implemented with quality bars for data and services, as well as accommodation of service level agreements (SLAs).

Figure 14:
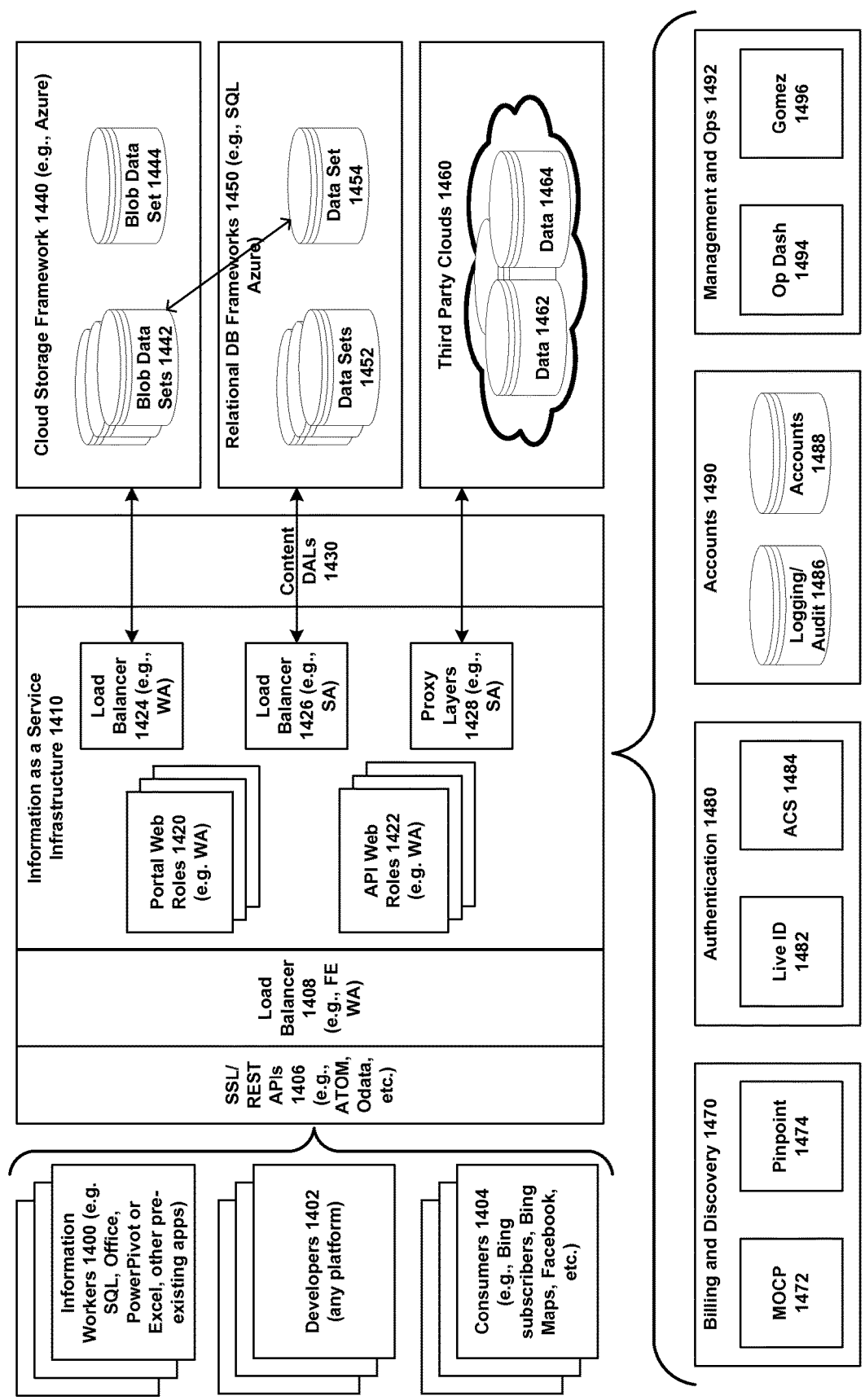
FIG. 14 is a block diagram illustrating an exemplary non-limiting set of implementation specific details for an infrastructure for information provided as a service from any platform.

FIG. 14 is an exemplary non-limiting implementation of the infrastructure 1410 for information as a service as described above according to one or more features. At the interaction side are information workers 1400, developers 1402 and consumers 1404 who can communicate with the infrastructure via SSL/REST based APIs 1406. A load balancer 1408 can be used to help steer traffic in an optimal way. In this regard, the input is routed to portal web roles 1420 or API web roles 1422. From the infrastructure 1410 to the data side is additional load balancing 1424 or 1426 (e.g., WA or SA) for access to blob data sets 1442, or blob data set 1455 of cloud storage framework 1440, or to data sets 1452 or data set 1454 of relational database frameworks 1450. Proxy layers 1428 can be used to access data 1462 or data 1464 of third party clouds 1460. Content data abstract layers (DALs) 1430 can be used to access content, where applicable. In this regard, there can be duplication or overlap of data sets across different types of storage, e.g., the same data might be represented as blob data and as structured data, e.g., SQL.

As supplemental services to the data, billing and discovery services 1470 can include online billing 1472 (e.g., MOCP) or discovery services 1474 (e.g., pinpoint) and authentication services 1480 can include credentials management 1482 (e.g., Live ID) or content authentication 1484, e.g., authenticated content services (ACS). Accounts services 1490 can include logging/audit services 1486 or account management 1488. Management and operations services 1492 can include an operations dashboard service 1494 and network operations service 1496, e.g., Gomez.

Figure 15:
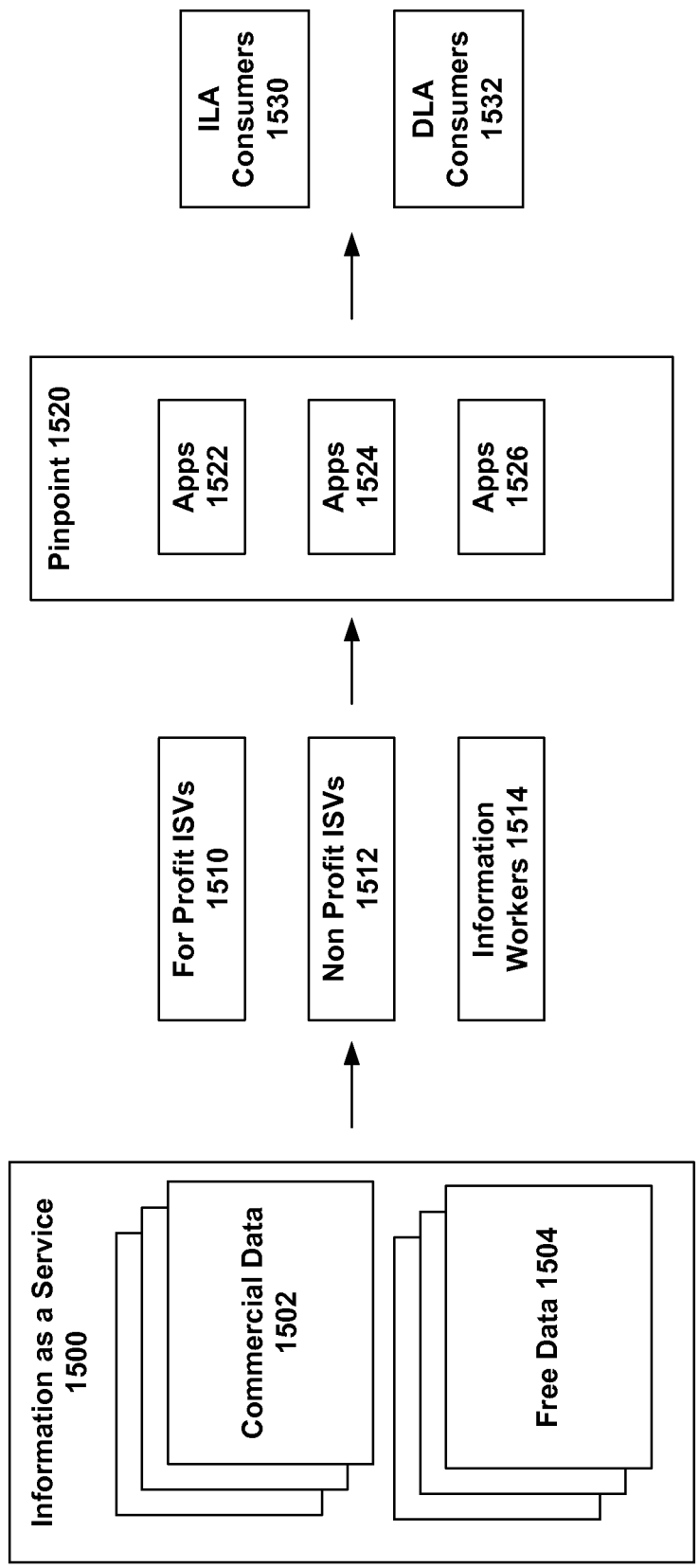
FIG. 15 is illustrative of exemplary consumption of data from an exemplary infrastructure for information provided as a service from any platform.

FIG. 15 is a block diagram illustrating an exemplary end to end flow from data to consumers of the data in accordance with one or more embodiments of the general infrastructure for enabling information as a service. For instance, information as a service 1500 can include commercial data 1502 and free data 1504, which can be of interest to various for profit developers 1510, nonprofit developers 1512 with non-profit motives and other information workers 1514 who are interested in consuming the data generally for productive goals. These entities can use discovery services 1520 to determine what applications 1522, 1524, . . . , 1526 may be of interest to them, and to ultimately transmit the data to ILA consumers 1530 and DLA consumers 1532 alike.

The Open Data Protocol

Those skilled in the art will appreciate that network interactions and information services may be practiced with a variety of computer system configurations and protocols. In this regard, one non-limiting implementation for querying and updating data that can be used in one or more embodiments described herein is the Open Data Protocol (OData).

OData is a web protocol for querying and updating data. OData applies web technologies such as HyperText Transfer Protocol (HTTP), Atom Publishing Protocol (AtomPub) and JavaScript Object Notation (JSON) to provide access to information from a variety of applications, services, and stores. For some general background, OData emerged organically based on the experiences implementing AtomPub clients and servers in a variety of products over the past several years. OData can be used to expose and access information from a variety of sources, including, but not limited to, relational databases, file systems, content management systems, and traditional web sites. OData has been released under the Open Specification Promise (OSP) to allow anyone to freely interoperate with OData implementations, in order to encourage growth of the ecosystem. Features of OData can be incorporated into other protocols as well to form hybrid protocols with similar functionality for querying and updating network data.

OData is consistent with the way the web works. In one aspect, OData uses universal resource identifiers (URIs) as a way to identify resources and uses an HTTP-centric protocol with a uniform interface for interacting with those resources, e.g., similar to the way that the Internet works. In one non-limiting aspect, OData builds on the conventions over HTTP popularized by AtomPub, which have simplified the process of sharing data, content and information across independently developed systems. OData defines additional conventions that implementations may optionally implement to support basic query and schema information to be exchanged. To simplify integration with HTML and JavaScript clients, OData defines an optional JSON representation of the protocol that complements the XML-based AtomPub format. As one can appreciate, additional implementation specific or other details regarding the OData protocol can be found at www.odata.org.

Exemplary Networked and Distributed Environments

One of ordinary skill in the art can appreciate that the various embodiments of methods and devices for an infrastructure for information as a service from any platform and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 16:
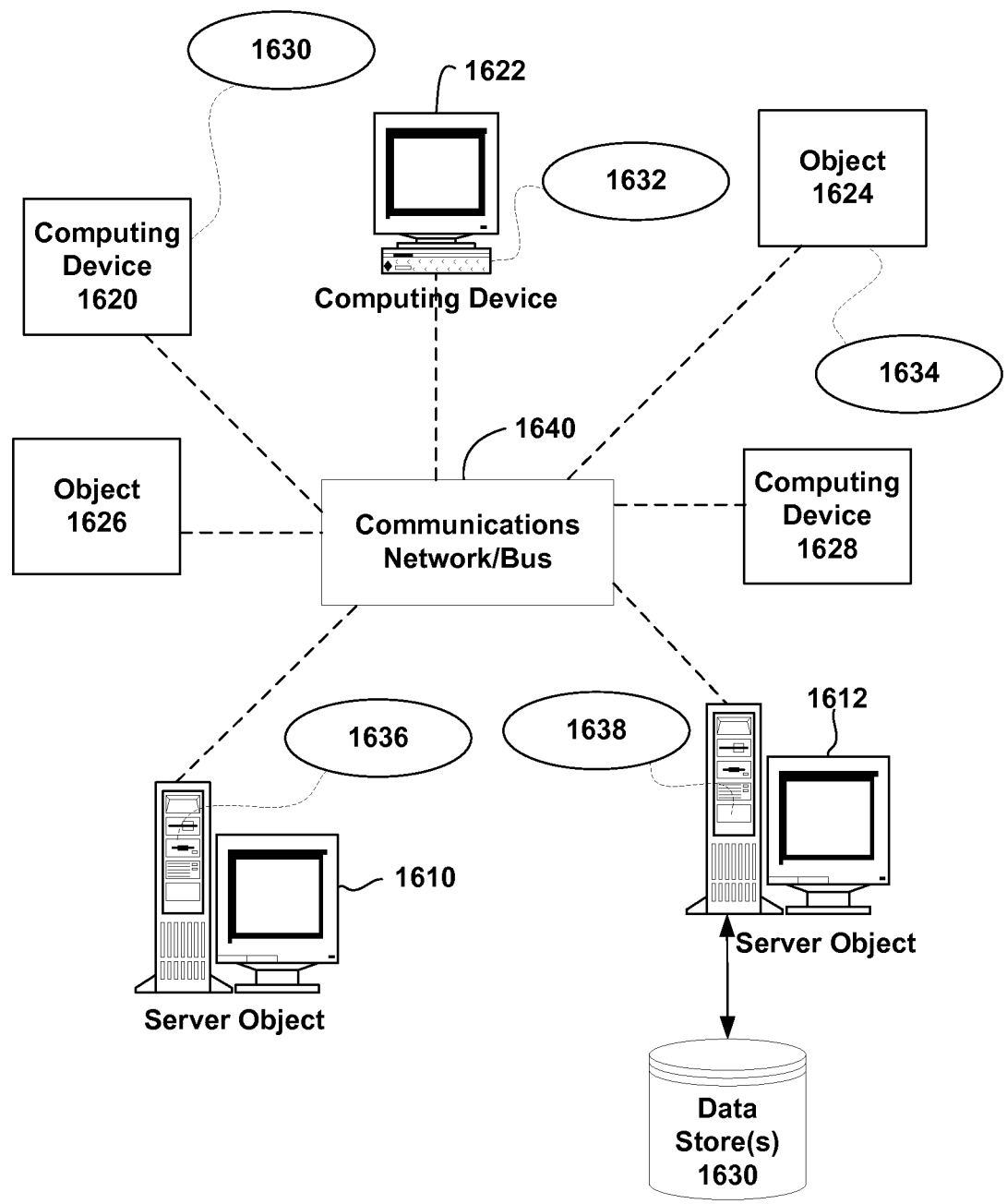
FIG. 16 is a block diagram representing exemplary non-limiting networked environments in which various embodiments described herein can be implemented.

FIG. 16 provides a non-limiting schematic diagram of an exemplary networked or distributed computing environment. The distributed computing environment comprises computing objects or devices 1610, 1612, etc. and computing objects or devices 1620, 1622, 1624, 1626, 1628, etc., which may include programs, methods, data stores, programmable logic, etc., as represented by applications 1630, 1632, 1634, 1636, 1638. It can be appreciated that computing objects or devices 1610, 1612, etc. and computing objects or devices 1620, 1622, 1624, 1626, 1628, etc. may comprise different devices, such as PDAs, audio/video devices, mobile phones, MP3 players, laptops, etc.

Each computing object or device 1610, 1612, etc. and computing objects or devices 1620, 1622, 1624, 1626, 1628, etc. can communicate with one or more other computing objects or devices 1610, 1612, etc. and computing objects or devices 1620, 1622, 1624, 1626, 1628, etc. by way of the communications network 1640, either directly or indirectly. Even though illustrated as a single element in FIG. 16, network 1640 may comprise other computing objects and computing devices that provide services to the system of FIG. 16, and/or may represent multiple interconnected networks, which are not shown. Each computing object or device 1610, 1612, etc. or 1620, 1622, 1624, 1626, 1628, etc. can also contain an application, such as applications 1630, 1632, 1634, 1636, 1638, that might make use of an API, or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 16, as a non-limiting example, computing objects or devices 1620, 1622, 1624, 1626, 1628, etc. can be thought of as clients and computing objects or devices 1610, 1612, etc. can be thought of as servers where computing objects or devices 1610, 1612, etc. provide data services, such as receiving data from computing objects or devices 1620, 1622, 1624, 1626, 1628, etc., storing of data, processing of data, transmitting data to computing objects or devices 1620, 1622, 1624, 1626, 1628, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1640 is the Internet, for example, the computing objects or devices 1610, 1612, etc. can be Web servers with which the computing objects or devices 1620, 1622, 1624, 1626, 1628, etc. communicate via any of a number of known protocols, such as HTTP. As mentioned, computing objects or devices 1610, 1612, etc. may also serve as computing objects or devices 1620, 1622, 1624, 1626, 1628, etc., or vice versa, as may be characteristic of a distributed computing environment.

Exemplary Computing Device

As mentioned, various embodiments described herein apply to any device wherein it may be desirable to implement one or pieces of an infrastructure for information as a service from any platform. It should be understood, therefore, that handheld, portable and other computing devices and computing objects of all kinds are contemplated for use in connection with the various embodiments described herein, i.e., anywhere that a device may provide some functionality in connection with an infrastructure for information as a service from any platform. Accordingly, the below general purpose remote computer described below in FIG. 17 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 17:
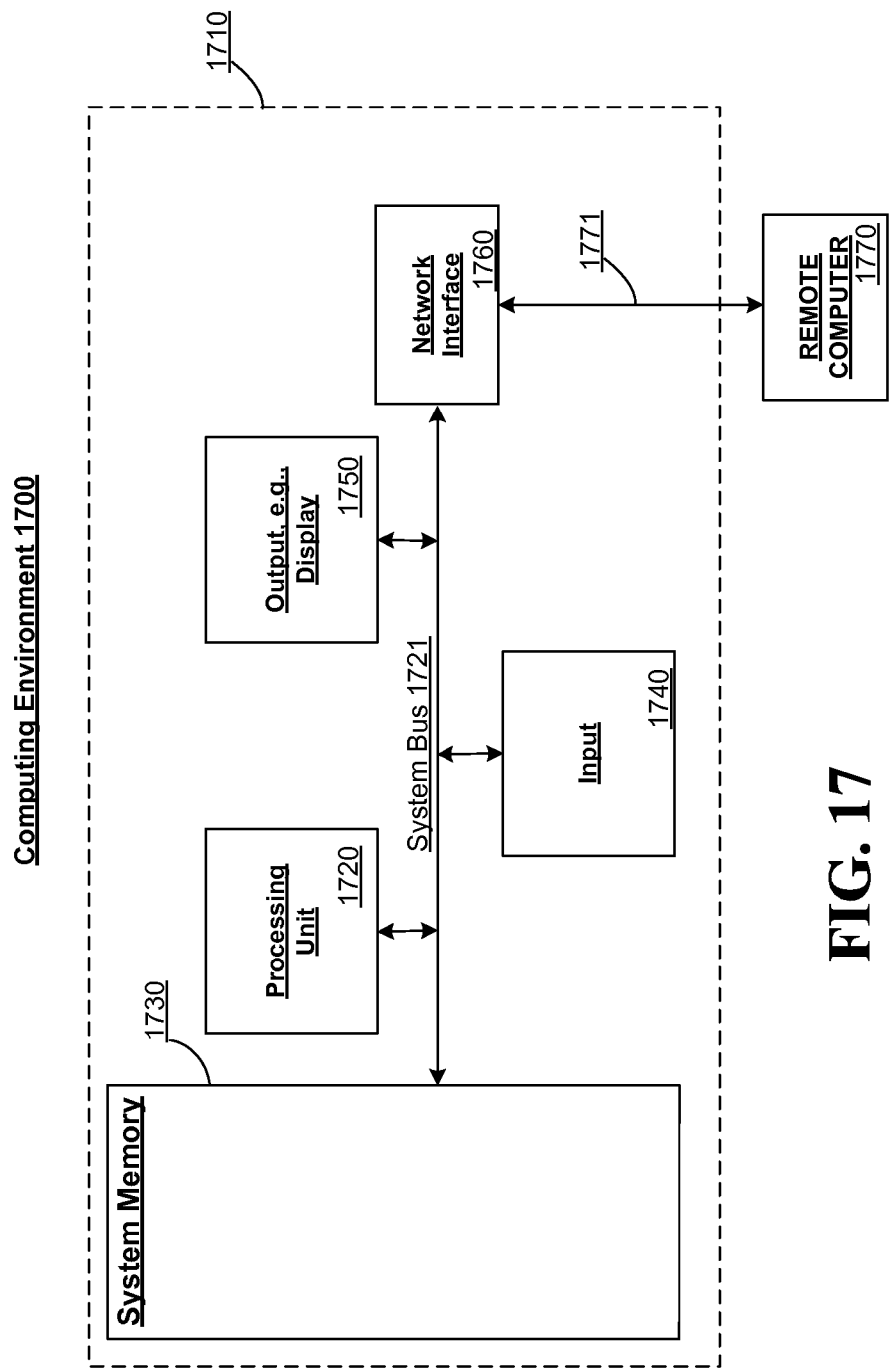
FIG. 17 is a block diagram representing an exemplary non-limiting computing system or operating environment in which one or more aspects of various embodiments described herein can be implemented.

FIG. 17 thus illustrates an example of a suitable computing system environment 1700 in which one or more of the embodiments may be implemented, although as made clear above, the computing system environment 1700 is only one example of a suitable computing environment and is not intended to suggest any limitation as to the scope of use or functionality of any of the embodiments. Neither should the computing environment 1700 be interpreted as having any dependency or requirement relating to any one or combination of components illustrated in the exemplary operating environment 1700.

With reference to FIG. 17, an exemplary remote device for implementing one or more embodiments herein can include a general purpose computing device in the form of a handheld computer 1710. Components of handheld computer 1710 may include, but are not limited to, a processing unit 1720, a system memory 1730, and a system bus 1721 that couples various system components including the system memory to the processing unit 1720.

Computer 1710 typically includes a variety of computer readable media and can be any available media that can be accessed by computer 1710. The system memory 1730 may include computer storage media in the form of volatile and/or nonvolatile memory such as read only memory (ROM) and/or random access memory (RAM). By way of example, and not limitation, memory 1730 may also include an operating system, application programs, other program modules, and program data.

A user may enter commands and information into the computer 1710 through input devices 1740 A monitor or other type of display device is also connected to the system bus 1721 via an interface, such as output interface 1750. In addition to a monitor, computers may also include other peripheral output devices such as speakers and a printer, which may be connected through output interface 1750.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1771, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to publish, build applications for or consume data in connection with interactions with a cloud or network service.

There are multiple ways of implementing one or more of the embodiments described herein, e.g., an appropriate API, tool kit, driver code, operating system, control, standalone or downloadable software object, etc. which enables applications and services to use the infrastructure for information as a service from any platform. Embodiments may be contemplated from the standpoint of an API (or other software object), as well as from a software or hardware object that facilitates provision of an infrastructure for information as a service from any platform in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method, performed by a data processing system for identifying correlations between and querying tables, the data processing system including a processor and a storage device including instructions, which upon execution by the processor, control the system to perform the method comprising:
   receiving a selected subset of data from a column of a first table that was published by a first publisher and stored in a data repository;
   inferring a candidate semantic type of data in the column of the first table based upon an analysis of the selected subset of data, the inferring comprising:
      identifying a format in which values in the selected subset of data are represented by comparing a structure of at least one value in the selected subset of data to a plurality of known data patterns; and
      inferring the candidate semantic type when it is determined that a number of values in the selected subset of data having a structure that matches the identified format exceeds a predetermined threshold;
   receiving a second table that was published by a second publisher and stored in the data repository, the second publisher being different from the first publisher;
   determining that a column of the second table is associated with the candidate semantic type;
   determining that the column of the first table and the column of the second table are overlapping based on the determination that the column of the second table is associated with the candidate semantic type; and
   joining the first table and the second table along the overlapping column to generate a third table.

2. The method of claim 1, further comprising:
   presenting invalid values to a user, the invalid values representing values of the data in the column of the first table that are disallowed by a set of domain rules and modifying at least one of the invalid values based on user input by correcting one or more of the invalid values.

3. The method of claim 1, further comprising:
   presenting invalid values to a user, the invalid values representing values of the data in the column of the first table that are disallowed by a set of domain rules and modifying at least one of the invalid values based on user input by accepting one or more of the invalid values.

4. The method of claim 1, further comprising validating values of the data in the column of the first table against a set of domain rules, wherein the validating comprises:
   determining if each of the values of the data in the column of the first table is within a range of valid numeric values.

5. The method of claim 1, wherein the receiving the selected subset of data comprises receiving an entirety of the column of the first table.

6. The method of claim 1, wherein the receiving the selected subset of data comprises receiving values of the column of the first table selected at random.

7. The method of claim 1, wherein the receiving the selected subset of data comprises receiving a pre-determined number of values from at least one of a beginning of the column of the first table, a middle of the column of the first table, or an end of the column of the first table.

8. The method of claim 1, wherein the inferring the candidate semantic type of the data in the column of the first table based upon the analysis of the selected subset of data comprises:
   selecting at least one reference data set based upon the identified format, wherein the at least one reference data set is associated with a known semantic type;
   comparing values of the selected subset of data against the at least one reference data set; and
   inferring the candidate semantic type of the data in the column of the first table based at least upon at least one result of the comparing.

9. The method of claim 8, wherein the comparing the values of the selected subset of data against the at least one reference data set comprises:
   selecting a value from the selected subset of data;
   querying the at least one reference data set with the selected value; and
   counting a valid hit when a result of the query with the selected value is returned.

10. The method of claim 1, further comprising:
    displaying a visualization of the relationship information as part of a graphical user interface.

11. The method of claim 10, further comprising:
    receiving input via the graphical user interface; and
    updating the relationship information based upon the input.

12. The method of claim 1, further comprising outputting the candidate semantic type for external confirmation.

13. The method of claim 1, further comprising validating values of the data in the column of the first table against a set of domain rules, the set of domain rules establishing valid data values for the candidate semantic type.

14. A data processing system for identifying correlations between and querying tables, comprising:
    one or more processors;
    a semantic analysis component executed by at least one of the one or more processors, the semantic analysis component being configured to:
    infer a candidate semantic type of data in a column of a first table published by a first publisher, wherein the semantic analysis component is configured to infer the candidate semantic type by:
       identifying a format in which values in the selected subset of data are represented by comparing a structure of at least one value in the selected subset of data to a plurality of known data patterns; and inferring the candidate semantic type when it is determined that a number of values in the selected subset of data having a structure that matches the identified format exceeds a predetermined threshold;

receive a second table that was published by a second publisher, the second publisher being different from the first publisher; and determine that a column of the second table is associated with the candidate semantic type; and a linking component executed by at least one of the one or more processors, the linking component being configured to:

determine that the column of the first table and the column of the second table are overlapping based on the determination that the column of the second table is associated with the candidate semantic type; and join the first table and the second table along the overlapping column to generate a third table.

15. The system of claim 14, wherein the semantic analysis component comprises:

a format check component configured to identify a format of sample data extracted from the column of the first table and to select one or more reference data sets based upon the format; and a value check component configured to check values of the sample data against the one or more reference data sets to identify a semantic type of the sample data, wherein the semantic analysis component configured to infer the candidate semantic type of the data in the column of the first table based at least upon the identified semantic type of the sample data.

16. The system of claim 14, further comprising a domain check component is further configured to present invalid values to a user, the invalid values representing values of the data in the column of the first table that are disallowed by a set of domain rules and to modify at least one of the invalid values by correcting or accepting one or more of the invalid values.

17. The system of claim 14, further comprising:

a linking component configured to correlate a plurality of disparate tables based upon respective semantic information associated therewith.

18. The system of claim 14, wherein the visualization comprises a graph display where nodes represent the first table and the second table and an edge represents the overlapping column between the first table and the second table.

19. The system of claim 14, further comprising a domain check component executed by at least one of the one or more processors, the domain check component being configured to validate values of the data in the column of the first table against a set of domain rules, the set of domain rules establishing valid data values for the candidate semantic type.

20. A non-transitory computer-readable memory device comprising computer-executable instructions that, in response to execution, cause a computing device to perform operations, the operations including:

receiving a selected subset of data from a column of a first table that was published by a first publisher and stored in a data repository;

inferring a candidate semantic type of data in the column of the first table based upon an analysis of the selected subset of data, the inferring comprising:

identifying a format in which values in the selected subset of data are represented by comparing a structure of at least one value in the selected subset of data to a plurality of known data patterns; and inferring the candidate semantic type when it is determined that a number of values in the selected subset of data having a structure that matches the identified format exceeds a predetermined threshold;

validating values of the data in the column of the first table against a set of domain rules, the set of domain rules establishing valid data values for the candidate semantic type;

receiving a second table that was published by a second publisher, the second publisher being different from the first publisher;

determining that a column of the second table is associated with the candidate semantic type;

determining that the column of the first table and the column of the second table are overlapping based on the determination that the column of the second table is associated with the candidate semantic type; and joining the first table and the second table along the overlapping column to generate a third table.

* * * * *